United States Patent
Nakatsuka et al.

(10) Patent No.: US 11,023,706 B2
(45) Date of Patent: Jun. 1, 2021

(54) MEASUREMENT SYSTEM AND MEASUREMENT METHOD

(71) Applicant: OMRON Corporation, Kyoto (JP)

(72) Inventors: Hitoshi Nakatsuka, Kawanishi (JP); Toyoo Iida, Nagaokakyo (JP)

(73) Assignee: OMRON Corporation, Kyoto (JP)

( * ) Notice: Subject to any disclaimer, the term of this patent is extended or adjusted under 35 U.S.C. 154(b) by 153 days.

(21) Appl. No.: 16/413,619

(22) Filed: May 16, 2019

(65) Prior Publication Data

US 2019/0392193 A1    Dec. 26, 2019

(30) Foreign Application Priority Data

Jun. 20, 2018    (JP) .............................. JP2018-116989

(51) Int. Cl.
| | | |
|---|---|---|
| *G06K 9/00* | (2006.01) | |
| *G06T 7/521* | (2017.01) | |
| *G01C 3/08* | (2006.01) | |

(52) U.S. Cl.
CPC .......... *G06K 9/00201* (2013.01); *G06T 7/521* (2017.01); *G01C 3/08* (2013.01)

(58) Field of Classification Search
None
See application file for complete search history.

(56) References Cited

U.S. PATENT DOCUMENTS

| | | | |
|---|---|---|---|
| 2013/0156268 A1* | 6/2013 | Sonoda | G06F 11/10 382/106 |
| 2014/0071243 A1* | 3/2014 | Nakatsukasa | G01B 11/24 348/46 |
| 2015/0022637 A1* | 1/2015 | Saeki | G06T 7/521 348/46 |
| 2015/0022638 A1* | 1/2015 | Saeki | G06T 7/521 348/46 |
| 2015/0204657 A1* | 7/2015 | Fujita | G01B 11/2513 348/135 |

FOREIGN PATENT DOCUMENTS

| | | | | |
|---|---|---|---|---|
| CN | 103673920 A | * | 3/2014 | ........ G01B 11/2545 |
| JP | 2012079294 | | 4/2012 | |

* cited by examiner

*Primary Examiner* — Jiangeng Sun
(74) *Attorney, Agent, or Firm* — JCIPRNET

(57) ABSTRACT

A measurement system includes a first distance calculation unit that searches for a corresponding region, indicating a same array as an array of codes indicated by a predetermined number of reference patterns included in a unit region set in the projection pattern, from a set of the codes, and calculates a distance from an irradiation reference surface of the projection pattern to each portion of the object on the basis of a search result of the corresponding region, and a second distance calculation unit that attempts to estimate a distance for the defective portion for which the first distance calculation unit is not able to calculate the distance by reconstructing an incomplete code corresponding to the defective portion using peripheral information in the input image.

19 Claims, 15 Drawing Sheets

```
1 2 0 3 1
3 2 1 0 1
2 0 0 1 2
3 3 0 1 1
1 2 3 0 1
```
FIG. 12(A)
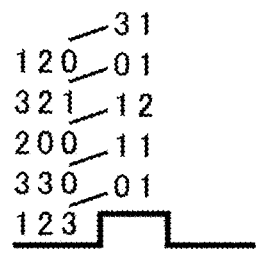
FIG. 12(B)
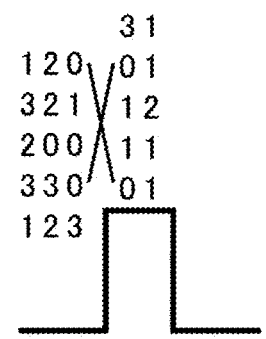
FIG. 12(C)
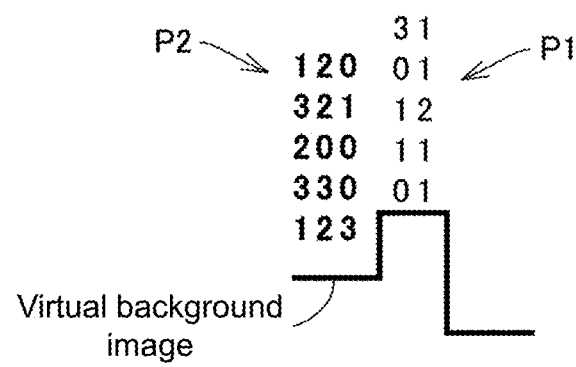
FIG. 12(D)

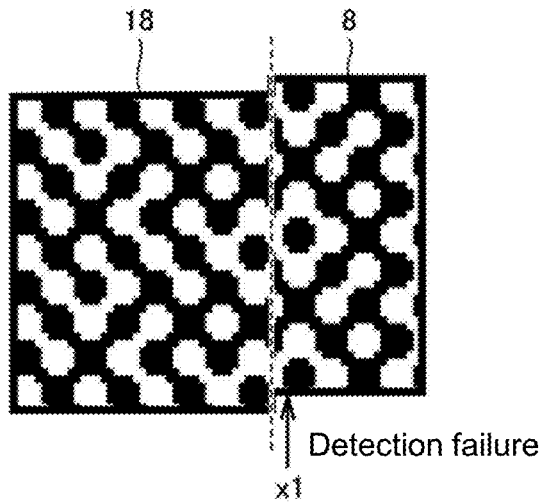 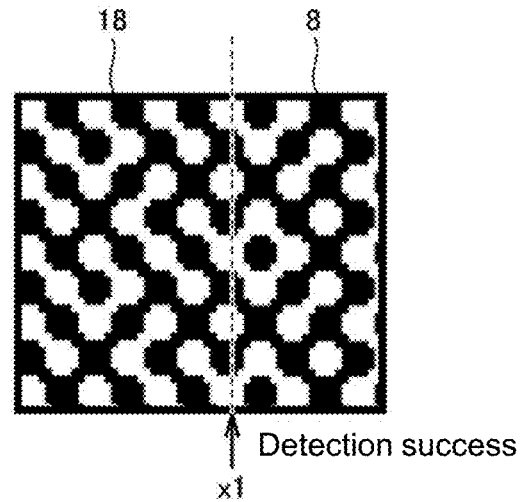
FIG. 17(A)  FIG. 17(B)
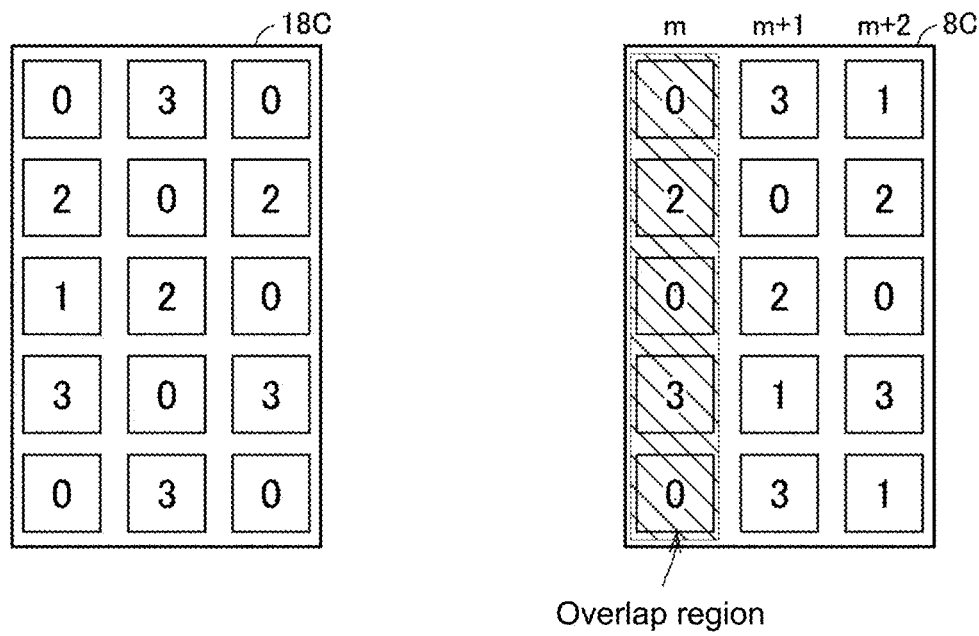
FIG. 18

MEASUREMENT SYSTEM AND MEASUREMENT METHOD

CROSS-REFERENCE TO RELATED APPLICATION

This application claims the priority of Japan patent application serial no. 2018-116989, filed on Jun. 20, 2018. The entirety of the above-mentioned patent application is hereby incorporated by reference herein and made a part of this specification.

BACKGROUND

Technical Field

The present disclosure relates to a measurement system and a measurement method for measuring a position of an object on the basis of an image obtained by imaging the object in a state where the object is irradiated with a projection pattern determined in advance.

Description of Related Art

Hitherto, a technique for measuring the three-dimensional shape of an object using an optical method has been known. For example, Japanese Patent Laid-Open No. 2012-079294 (Patent Document 1) discloses an image information processing device that projects a projection pattern onto a subject, the projection pattern including a two-dimensional point string obtained by assigning, as symbols, points having different colors or luminances for each type of code to each code of a projection code string in which multiple types of codes are lined up two-dimensionally, and performs three-dimensional measurement of a subject using a captured image obtained by imaging the subject onto which the projection pattern is projected.

In a method disclosed in Patent Document 1 described above, an information code string is restored by performing code error detection using a predetermined number of information code strings. However, in a case where a predetermined number of information code strings cannot be acquired, there is a possibility of the objective information code string not being able to be restored. That is, the information code string cannot be restored by a peripheral search only, and thus a defective portion which cannot be measured may occur.

SUMMARY

According to an embodiment of the present disclosure, there is provided a measurement system including an acquisition unit that acquires an input image which is an image obtained by imaging an object in a state where the object is irradiated with a projection pattern determined in advance. The projection pattern is configured with multiple types of reference patterns to which specific codes are assigned in accordance with a predetermined rule. The measurement system includes a first distance calculation unit that searches for each reference pattern included in the radiated projection pattern within the input image to acquire a position at which each reference pattern is radiated and a set of codes indicated by the radiated reference pattern, searches for a corresponding region, indicating a same array as an array of codes indicated by a predetermined number of reference patterns included in a unit region set in the projection pattern, from a set of the codes, and calculates a distance from an irradiation reference surface of the projection pattern to each portion of the object on the basis of a search result of the corresponding region; a background information generation unit that generates a virtual background image to be captured in a case where the projection pattern is radiated from the irradiation reference surface to a plane surface located at an arbitrary distance or a virtual background image code corresponding to the virtual background image; and a second distance calculation unit that attempts to estimate a distance for the defective portion for which the first distance calculation unit is not able to calculate the distance by reconstructing an incomplete code corresponding to the defective portion using peripheral information in the input image.

According to another embodiment of the present disclosure, there is provided a measurement method including a step of acquiring an input image which is an image obtained by imaging an object in a state where the object is irradiated with a projection pattern determined in advance. The projection pattern being configured with multiple types of reference patterns to which specific codes are assigned in accordance with a predetermined rule. The measurement method includes a step of searching for each reference pattern included in the radiated projection pattern within the input image to acquire a position at which each reference pattern is radiated and a set of codes indicated by the radiated reference pattern, searching for a corresponding region, indicating a same array as an array of codes indicated by a predetermined number of reference patterns included in a unit region set in the projection pattern, from a set of the codes, and calculating a distance from an irradiation reference surface of the projection pattern to each portion of the object on the basis of a search result of the corresponding region; and a step of attempting to estimate a distance for the defective portion for which the distance is not able to be calculated by reconstructing an incomplete code corresponding to the defective portion using peripheral information in the input image.

BRIEF DESCRIPTION OF THE DRAWINGS

FIG. 12(A) to FIG. 12(D) are diagrams schematically illustrating the details of a process of estimating three-dimensional information based on the measurement system according to the present embodiment.

FIG. 15(A) to FIG. 5(D) are diagrams illustrating a process (image based) of estimating three-dimensional information which is provided by the measurement system according to the present embodiment.

FIG. 17(A) and FIG. 17(B) are diagrams illustrating a processing stage of a process of estimating three-dimensional information which is provided by the measurement system according to the present embodiment.

FIG. 18 is a diagram illustrating a process (code based) of estimating three-dimensional information which is provided by the measurement system according to the present embodiment.

DESCRIPTION OF THE EMBODIMENTS

Figure 1:
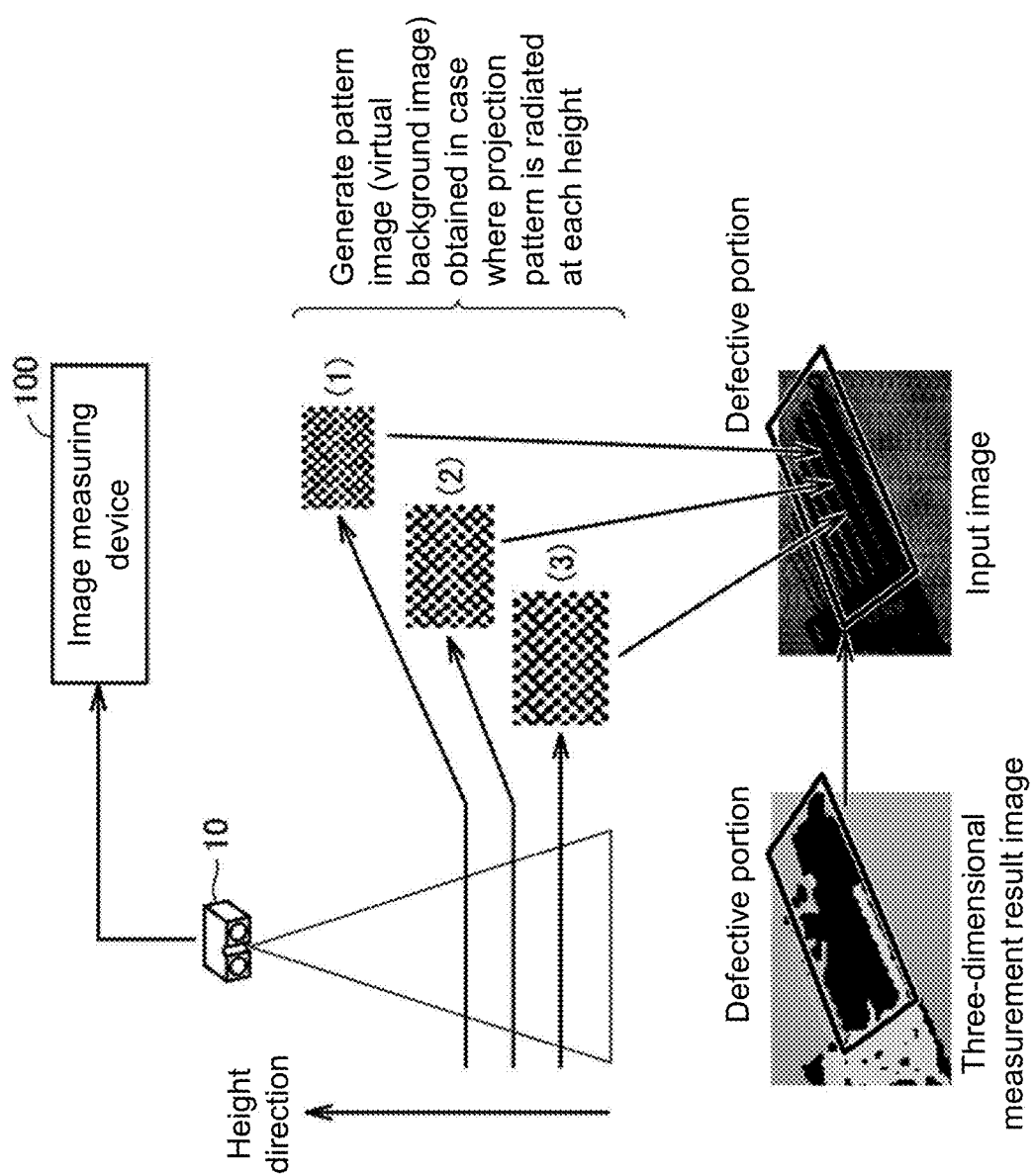
FIG. 1 is a schematic diagram illustrating an application example of a measurement system according to the present embodiment.

The present disclosure provides means for a solution for improving the robustness of measurement in a configuration in which the position of an object is measured on the basis of an image obtained by imaging the object in a state where the object is irradiated with a projection pattern determined in advance.

According to this disclosure, the calculation of a distance is realized insofar as possible with respect to the defective portion for which a distance cannot be calculated.

In the aforementioned disclosure, the measurement system further includes a background information generation unit that generates a virtual background image to be captured in a case where the projection pattern is radiated from the irradiation reference surface to a plane surface located at an arbitrary distance or a virtual background image code corresponding to the virtual background image. The second distance calculation unit attempts to estimate a distance for the defective portion using information of the input image corresponding to the defective portion and the virtual background image or the virtual background image code.

According to this disclosure, an estimation process is applied using a virtual background image code or a virtual background image to be captured in a case where the projection pattern is radiated from the irradiation reference surface to a plane surface located at an arbitrary distance, with respect to the defective portion for which a distance from the irradiation reference surface of the projection pattern cannot be calculated. Thereby, even in the case of an object having a change in shape with a width smaller than the resolution of measurement, distance information thereof can be detected.

In the aforementioned disclosure, the image measurement system further includes a synthetic pattern generation unit that synthesizes a corresponding partial pattern of the virtual background image with a portion corresponding to the defective portion of the input image or a vicinity of the corresponding portion. The second distance calculation unit attempts to search for the corresponding region while sequentially changing at least one of the partial pattern of the virtual background image synthesized with the input image and a distance for a plane surface when the virtual background image is generated.

According to this disclosure, it is possible to improve the probability of a distance for the defective portion to be estimated by attempting to search for the corresponding region recursively.

In the aforementioned disclosure, the second distance calculation unit repeats a process of searching for the same array as an array of codes indicated by a predetermined number of reference patterns included in a unit region set in the projection pattern with respect to one or a plurality of code strings generated by a combination of at least a portion of a code searched for in a portion corresponding to the defective portion of the input image and a code to which the virtual background image code corresponds.

According to this disclosure, it is possible to more reliably establish a correspondence relation between the projection pattern and an irradiation destination within the input image, and to improve the accuracy of calculation of a distance.

In the aforementioned disclosure, the background information generation unit generates a plurality of the virtual background images or the virtual background image codes with respect to plane surfaces located at a plurality of different distances from the irradiation reference surface.

According to this disclosure, it is possible to improve the probability of a distance for the defective portion being able to be estimated by applying the virtual background image or the virtual background image code for a plurality of different distances.

In the aforementioned disclosure, the second distance calculation unit changes a positional relationship between the information of the input image corresponding to the defective portion and the virtual background image or the virtual background image code along an epipolar line.

According to this disclosure, by changing a positional relationship between the virtual background image and the virtual background image code along the epipolar line, it is possible to realize making the heights of the virtual background image and the virtual background image code different from each other, and to improve a processing speed.

In the aforementioned disclosure, the second distance calculation unit determines that estimation of a distance for the defective portion is successful in a case where the estimated distance for the defective portion is different from a distance when the virtual background image or the virtual background image code used in the estimation is generated.

According to this disclosure, it is possible to reduce the possibility that a distance when the virtual background image and the virtual background image code are generated is incorrectly calculated as a distance for the defective portion.

According to this disclosure, the calculation of a distance is realized insofar as possible with respect to the defective portion for which a distance cannot be calculated.

According to the present disclosure, it is possible to improve the robustness of measurement in a configuration in which the position of an object is measured on the basis of an image obtained by imaging the object in a state where the object is irradiated with a projection pattern determined in advance.

An embodiment of the present disclosure will be described in detail with reference to the accompanying drawings. Meanwhile, the same or equivalent portions in the drawings are denoted by the same reference numerals and signs, and thus description thereof will not be repeated.

A. Application Example

First, an example of a scenario in which the present disclosure is applied will be described.

FIG. 1 is a schematic diagram illustrating an application example of a measurement system 1 according to the present embodiment. Referring to FIG. 1, the measurement system 1 according to the present embodiment includes a measuring head 10 and an image measuring device 100.

The image measuring device 100 irradiates an object with a projection pattern determined in advance from the measuring head 10, and then acquires an input image which is an image obtained by imaging the object using the measuring head 10. Typically, a projection pattern according to structured illumination is adopted. That is, the projection pattern to be adopted is configured with multiple types of reference patterns to which specific codes are assigned in accordance with a predetermined rule.

The image measuring device 100 acquires a three-dimensional measurement result (a three-dimensional measurement result image) by executing a three-dimensional measurement process using information of a projection pattern and information of a projection pattern appearing in the acquired input image.

More specifically, the image measuring device 100 searches for each reference pattern (hereinafter, also referred to as a "primitive") included in the radiated projection pattern within the input image, to thereby acquire a position at which each primitive is radiated and a set of codes indicated by the radiated primitive. The image measuring device 100 searches for a corresponding region (hereinafter, also referred to as a "lattice-like code pattern"), indicating the same array as an array of codes indicated by a predetermined number of reference patterns included in a unit region (hereinafter, also referred to as a "word") set in the projection pattern, from a set of the codes. Finally, the image measuring device 100 calculates a distance from the irradiation reference surface of the projection pattern to each portion of an object on the basis of the search result of the lattice-like code pattern. A set of the calculated distances can be represented as a three-dimensional measurement result image.

A defective portion which is a portion for which a distance cannot be calculated may be present in the three-dimensional measurement result image. The measurement system 1 according to the present embodiment estimates a distance for such a defective portion. More specifically, the image measuring device 100 generates a pattern image (virtual background image) to be captured in a case where the projection pattern is radiated from the irradiation reference surface to a plane surface located at an arbitrary distance (three types of (1) to (3) in FIG. 1). Meanwhile, a virtual background image code corresponding to the pattern image (virtual background image) may be used instead of the pattern image (virtual background image).

The image measuring device 100 attempts to estimate a distance for a portion (defective portion) for which the distance cannot be calculated by reconstructing an incomplete code corresponding to the portion using peripheral information in the input image.

As a typical example, height information or the like is used as the peripheral information in the input image, and the image measuring device 100 attempts to estimate a distance for a portion for which a distance cannot be calculated (defective portion) using information of the input image corresponding to the defective portion and the virtual background image. That is, in the image measuring device 100 according to the present embodiment, a synthetic image is generated by extracting a defective portion for which a distance is not present within the three-dimensional measurement result image, specifying a region of the input image corresponding to the extracted defective portion, and applying a virtual background image having a different height to the specified region of the input image. The image measuring device 100 estimates the height of each portion included in the defective portion on the basis of the generated synthetic image. Thereby, even in the case of an object having a change in shape with a width smaller than a resolution, distance information thereof can be detected.

B. Device Configuration

Next, an example of a device configuration constituting the measurement system 1 according to the present embodiment will be described.

(b1: Measuring Head 10)

Figure 2:
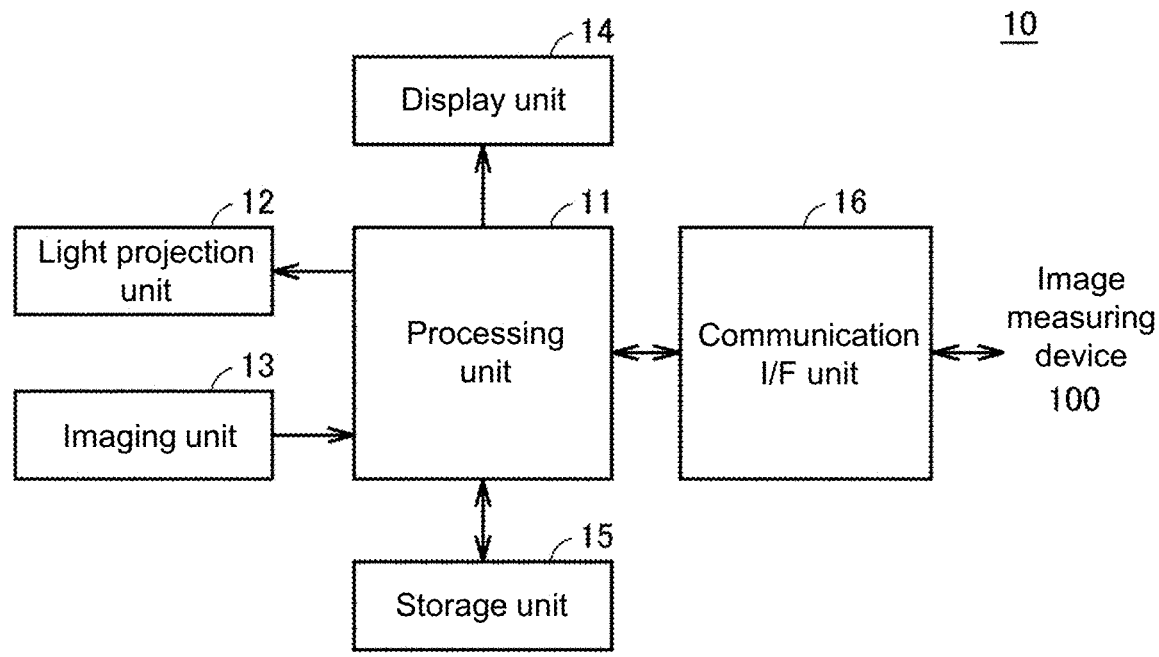
FIG. 2 is a schematic diagram illustrating a configuration example of a measuring head constituting the measurement system according to the present embodiment.

FIG. 2 is a schematic diagram illustrating a configuration example of the measuring head 10 constituting the measurement system 1 according to the present embodiment. Referring to FIG. 2, the measuring head 10 includes a processing unit 11, a light projection unit 12, an imaging unit 13, a display unit 14, and a storage unit 15.

The processing unit 11 takes charge of the entire process in the measuring head 10. The processing unit 11 typically includes a processor, a storage that stores command codes executed by the processor, and a memory that develops the command codes. In this case, in the processing unit 11, various processes are realized by the processor developing and executing the command codes on the memory. All or a part of the processing unit 11 may be mounted using a dedicated hardware circuit (such as, for example, an application specific integrated circuit (ASIC) or a field-programmable gate array (FPGA)).

The display unit 14 notifies the outside of various types of information acquired or calculated in the measuring head 10.

The storage unit 15 stores an image captured by the imaging unit 13, calibration parameters set in advance, and the like.

A communication interface (I/F) unit 16 takes charge of the exchange of data between the measuring head 10 and the image measuring device 100.

(b2: Image Measuring Device 100)

Figure 3:
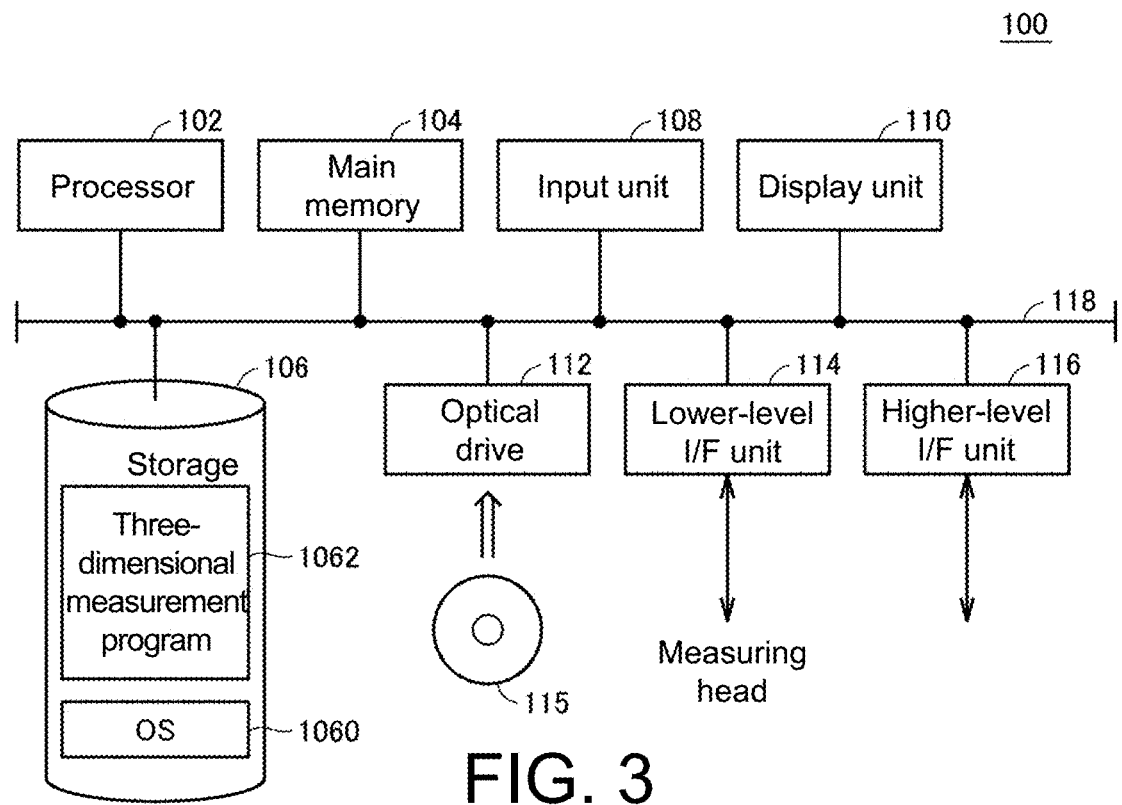
FIG. 3 is a schematic diagram illustrating a configuration example of an image measuring device included in the measurement system according to the present embodiment.

FIG. 3 is a schematic diagram illustrating a configuration example of the image measuring device 100 included in the measurement system 1 according to the present embodiment. Typically, the image measuring device 100 is realized using a general-purpose computer. Referring to FIG. 3, the image measuring device 100 includes a processor 102, a main memory 104, a storage 106, an input unit 108, a display unit 110, an optical drive 112, a lower-level interface unit 114, and a higher-level interface unit 116. These components are connected to each other through a processor bus 118.

The processor 102 is constituted by a central processing unit (CPU), a graphics processing unit (GPU), or the like, and realizes various processes that will be described later by reading out a program (as an example, an OS 1060 and a three-dimensional measurement program 1062) stored in the storage 106, and developing and executing the program on the main memory 104.

The main memory 104 is constituted by a volatile storage device or the like such as a dynamic random access memory (DRAM) or a static random access memory (SRAM). The storage 106 is constituted by a non-volatile storage device or the like such as, for example, a hard disk drive (HDD) or a solid state drive (SSD).

The storage 106 stores the three-dimensional measurement program 1062 for providing a function as the image measuring device 100 in addition to the OS 1060 for realizing a basic function.

The input unit 108 is constituted by a keyboard, a mouse or the like, and accepts a user's operation. The display unit 110 is constituted by a display, various indicators, a printer or the like, and outputs a process result from the processor 102 or the like.

The lower-level interface unit 114 takes charge of the exchange of data between measuring head 10 and the interface unit. The higher-level interface unit 116 takes charge of the exchange of data between a higher-level device (for example, a programmable logical controller (PLC)) which is not shown and the interface unit.

The image measuring device 100 has the optical drive 112, and a program stored in a recording medium 115 (an optical recording medium such as, for example, a digital versatile disc (DVD)) having a computer readable program non-transiently stored thereon is read therefrom and is installed in the storage 106 or the like.

The three-dimensional measurement program 1062 or the like which is executed in the image measuring device 100 may be installed through the computer readable recording medium 115, or may be installed in a form that is downloaded from a server device or the like on a network. In addition, a function which is provided by the three-dimensional measurement program 1062 according to the present embodiment may be realized in the form of using some modules which are provided by an OS.

FIG. 3 shows a configuration example in which required functions of the image measuring device 100 are provided by the processor 102 executing a program, but some or all of these provided functions may be mounted using a dedicated hardware circuit (such as, for example, an ASIC or an FPGA).

C. Three-Dimensional Measurement

Next, three-dimensional measurement based on the measurement system 1 according to the present embodiment will be described. In the present embodiment, three-dimensional measurement is realized using a method referred to as structured illumination. The method of structured illumination relates to a measurement system that irradiates an object with a projection pattern determined in advance, and measures the position (distance from the light projection unit or the light receiving unit) of the object on the basis of an image (hereinafter, also referred to as an "input image") obtained by imaging the object in a state where the projection pattern irradiation is performed. That is, the shape of the object is measured.

In the present embodiment, as an example of the structured illumination, a method of performing irradiation with measurement light having a projection pattern (typically, a shading pattern) determined in advance is adopted.

The measurement system 1 according to the present embodiment includes the imaging unit 13 which is equivalent to an acquisition unit that acquires an input image which is an image obtained by imaging the object in a state where the object is irradiated with a projection pattern determined in advance from the light projection unit 12. In the following description, the irradiation surface of the light projection unit 12 is regarded as the "irradiation reference surface" of a projection pattern P.

In the measurement system 1, calibration is executed between the light projection unit 12 and the imaging unit 13 which are included in the measuring head 10, optical parameters of the light projection unit 12 and the imaging unit 13 and a matrix in which they are associated with each other are determined in advance. The optical parameters of the light projection unit 12 and the imaging unit 13 are all determined on the basis of the same reference point. In a case where the height of the projection surface of the light projection unit 12 is designated, it is possible to calculate which pixel on the light receiving surface of the imaging unit 13 the projection pattern radiated from the light projection unit 12 corresponds to.

The projection pattern radiated from the light projection unit 12 changes in size or position (expansion and contraction of an interval between adjacent elements) in accordance with the position or inclination of the object with respect to the optical axis of the light projection unit 12, and the shape of the object can be measured by the principle of triangulation on the basis of such information.

Figure 4:
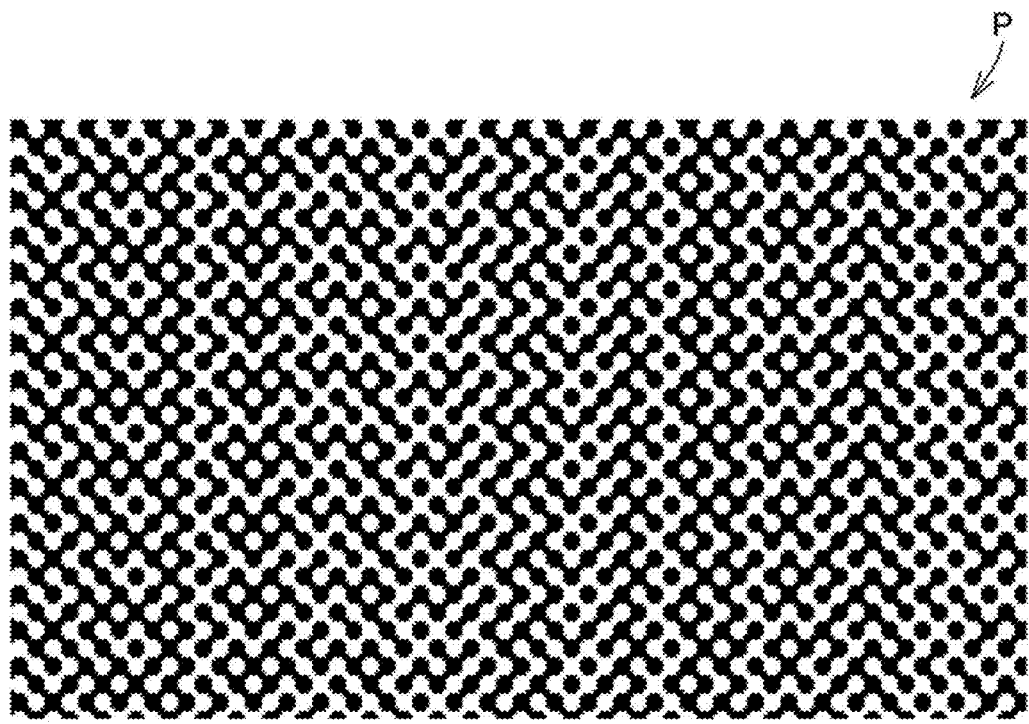
FIG. 4 is a diagram illustrating an example of a projection pattern radiated from the measuring head of the measurement system according to the present embodiment.
Figure 5A:
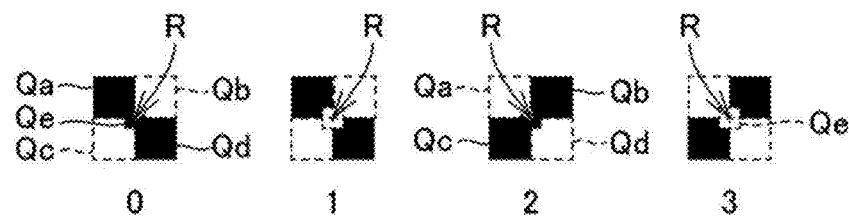
FIG. 5(A) to FIG. 5(C) are diagrams illustrating a principle of three-dimensional measurement which is executed by the measurement system according to the present embodiment.
Figure 5B:
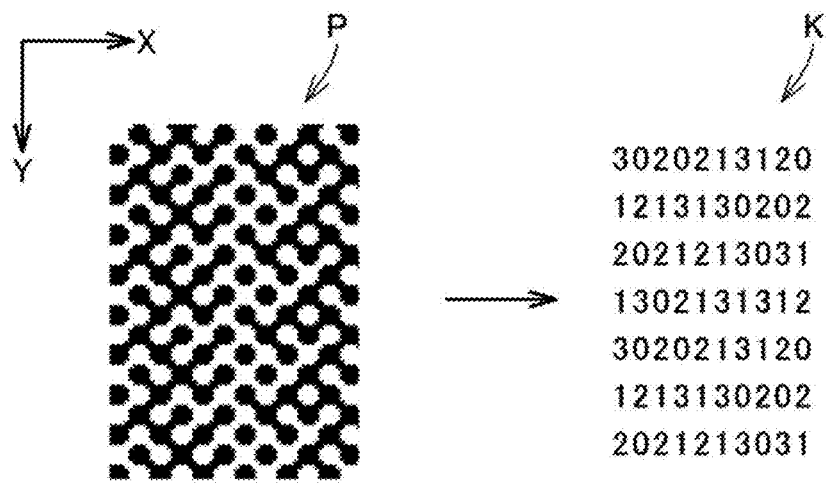
Figure 5C:
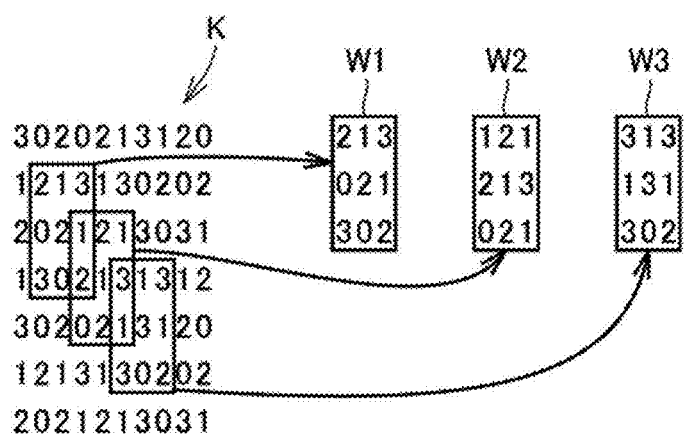

FIG. 4 is a diagram illustrating an example of a projection pattern radiated from the measuring head 10 of the measurement system 1 according to the present embodiment. FIG. 5(A) to FIG. 5(C) are diagrams illustrating a principle of three-dimensional measurement which is executed by the measurement system 1 according to the present embodiment.

The object is irradiated with measurement light including, for example, the projection pattern P as shown in FIG. 4 from the light projection unit 12 of the measuring head 10. The imaging unit 13 of the measuring head 10 images the object in a state where the projection pattern P is projected.

The projection pattern P shown in FIG. 5(A) to FIG. 5(C) refers to codes obtained by disposing space codes in a lattice shape (hereinafter, also referred to as "lattice-like codes"), and a specific code is assigned such that auto-correlation does not occur in a pattern having a predetermined length in a predetermined direction. More specifically, the projection pattern P is specified by a combination of multiple types of primitives (equivalent to a reference pattern). FIG. 5(A) shows four types of primitives. Each of the primitives indicates a code assigned to each primitive (four numerical values of 1 to 4 in the example shown in FIG. 5(A)).

Each of the primitives is constituted by four large squares Qa to Qd and one small square Qe located at the central portion. Each of the squares Qa to Qd is disposed so that a primitive position R is located at the corner. The primitive position R serves as the central position of the small square Qe.

As shown in FIG. 5(A), the intersection point (one point on the corner of the lattice) between the large squares Qa to Qd is defined as the primitive position R. Meanwhile, the size and shape of the primitive position R are not limited. Each of the primitives is restored as one of three-dimensional points.

As shown in FIG. 5(A), a relation of $p_0=1$ is represented when the primitive position R is "white," a relation of $p_0=0$ is represented when the primitive position is "black," a relation of $P_1=1$ is represented when the upper left large square Qb of the primitive position R is "white," and a relation of $P_1=0$ is represented when the primitive position is "black." The type of primitive can be numerically represented as $2p_1+p_0$.

In FIG. 5(B), the type of primitive included in a portion of the projection pattern p (see FIG. 4) is numerically represented. That is, a matrix K equivalent to the projection pattern P can be generated by specifying the type of each primitive included in the projection pattern P, and numerically representing the specified type of each primitive.

In the following description, in-plane directions of the projection pattern P are specified as an X direction and a Y direction, and the direction of an optical axis (height) is specified as a Z direction.

FIG. 5(C) shows a partial matrix of the matrix K shown in FIG. 5(B). A partial matrix having a predetermined size (word height $H_{word}$×word width $W_{word}$) which is set in the matrix K is assumed. Such a partial matrix is also referred to as a "word." That is, each word is specified by a combination (3×3 in the example shown in FIG. 5(C)) of the types of a predetermined number of primitives. The projection pattern P is generated by primitives being disposed so that each word becomes unique.

All the words included in the matrix K are extracted from an input image acquired by imaging the object in a state where the object is irradiated with the projection pattern P. Meanwhile, a process of extracting a primitive and specifying or reconstructing a word is also referred to as "decoding" of (a word).

FIG. 5(C) shows three extracted words (words W1, W2, and W3). When all the words are extracted from a pattern reflected on the input image, in a case where the lineup of numerical values of a partial matrix is unique among the extracted words, the position of the word in the pattern is specified. That is, the position in the projection pattern P (the position of the word) can be specified.

In a case where the object is irradiated with the projection pattern P from the measuring head 10 (the light projection unit 12), the position of a word specified from an irradiation image changes in accordance with the surface shape of the object.

A distance from the measuring head 10 to each portion of the object and the three-dimensional shape of the object can be measured on the basis of the size of a word specified from a primitive included in an image obtained by imaging the object in a state where the object is irradiated with such a projection pattern P and positional deviation between adjacent words.

For example, in the example shown in FIG. 5(C), the words W1 to W3 next to each other share some of primitives.

The image measuring device 100 (see FIG. 2) outputs a measurement result of the three-dimensional shape of the object by executing a process of extracting primitives and a process of evaluating the position and size of a word specified by the extracted primitives, with respect to an image which is output from each measuring head 10.

Meanwhile, FIG. 5(A) shows an example in which four types of primitives are used, but the number of types of primitives is not limited to four. In addition, any shape and color can be adopted without being limited to the shape and color of the primitive as shown in FIG. 5(A).

In addition, an example of a primitive detection method capable of being adopted includes pattern matching using each primitive as a model, a filtering process which is conditional on a black pixel direction/a white pixel direction and the color of a median value, or the like.

For example, a camera of 5M pixels ($\approx$2500×2000 pixels) is adopted, and the visual field thereof is set to a visual field of 500 mm×400 mm. Here, a case in which one primitive is formed of five pixels and one word is constituted by 5×5 (a total of 25) primitives is assumed.

In this case, the pitch of a primitive is set to approximately 1 mm (=500 mm/(2500 pixels/5 pixels)), and a minimum detection width is set to 5 mm (=1 mm×5 pixels). Since 5×5 pixels is required for detecting one word, an area of 5 mm×5 mm is required for association between the light projection unit 12 and the imaging unit 13. Meanwhile, the spatial resolution (x-y direction) of three-dimensional information serves as the unit (1 mm×1 mm in this example) of a primitive.

Meanwhile, in the following description, a set of points in a three-dimensional space that is restored (or to be restored) is also referred to as a "point group." That is, "point group" means a set of points in a three-dimensional space that is calculated (or to be calculated) corresponding to each primitive.

D. Problem to be Solved and Means for Solution

Next, a problem to be solved by the measurement system 1 according to the present embodiment and means for solution will be described.

Figure 6:
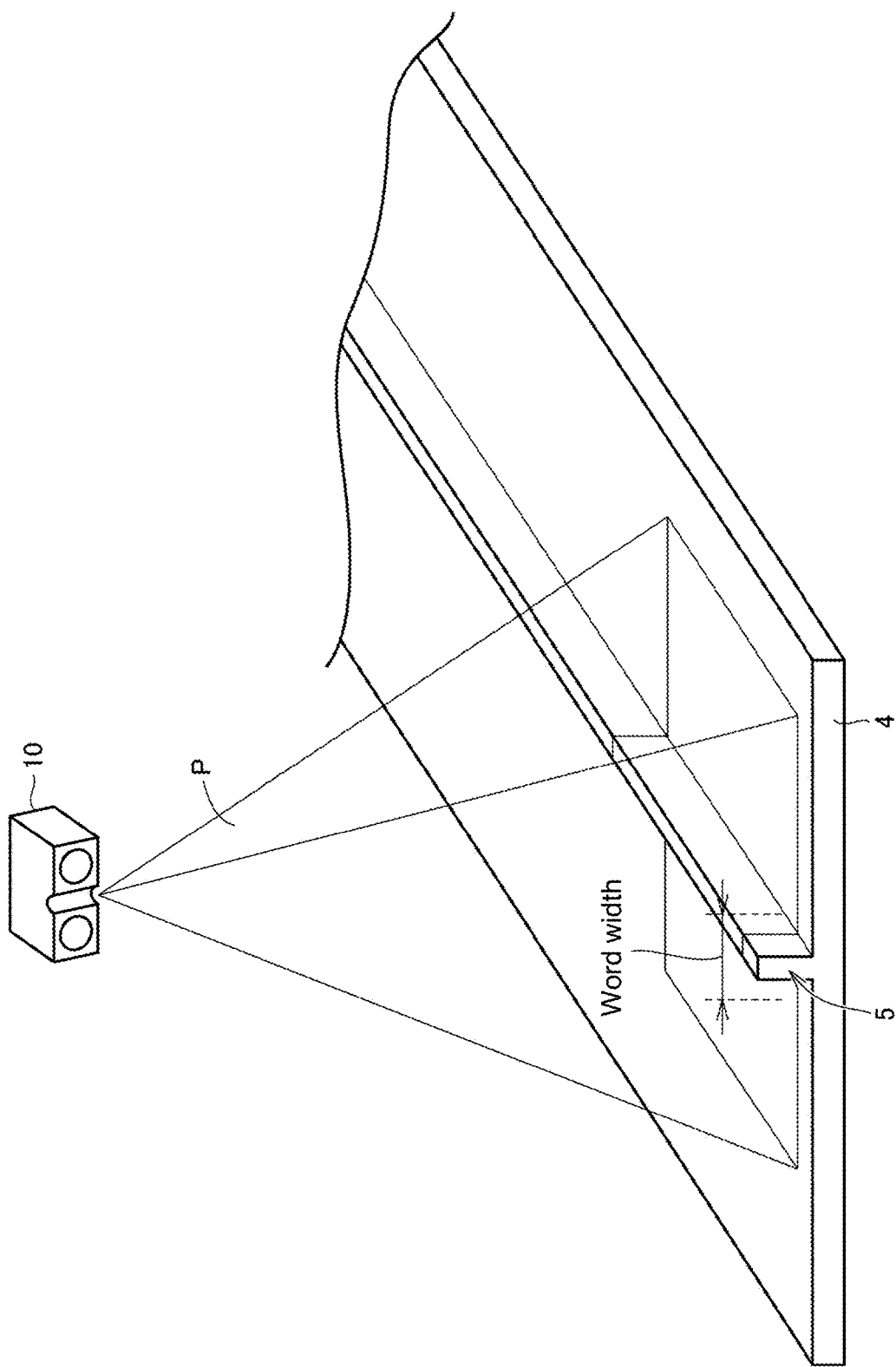
FIG. 6 is a schematic diagram illustrating an example of a measurement form based on the measurement system according to the present embodiment.

FIG. 6 is a schematic diagram illustrating an example of a measurement form based on the measurement system 1 according to the present embodiment. Referring to FIG. 6, measurement of the three-dimensional shape of a planar workpiece 4 is assumed. A protruding portion 5 having a predetermined width is formed on the upper surface of the planar workpiece 4. In the example shown in FIG. 6, the width of the protruding portion 5 is set to be smaller than the distance (word width $W_{word}$ required for reconstructing a word described in FIG. 5(C). That is, a gap occurs between a pattern that appears after irradiation of the exposed surface of the protruding portion 5 and a pattern that appears after irradiation of the exposed surface of the workpiece 4 other than the protruding portion 5, and the sizes of appearing primitives and the like are also different from each other.

As a result, a word reconstructed from the type of detected primitive is not coincident with a combination of any primitive types, and the position of each word in a pattern cannot be specified. As a result, shape information of the protruding portion 5 cannot be acquired (height information is defective).

Figure 7:
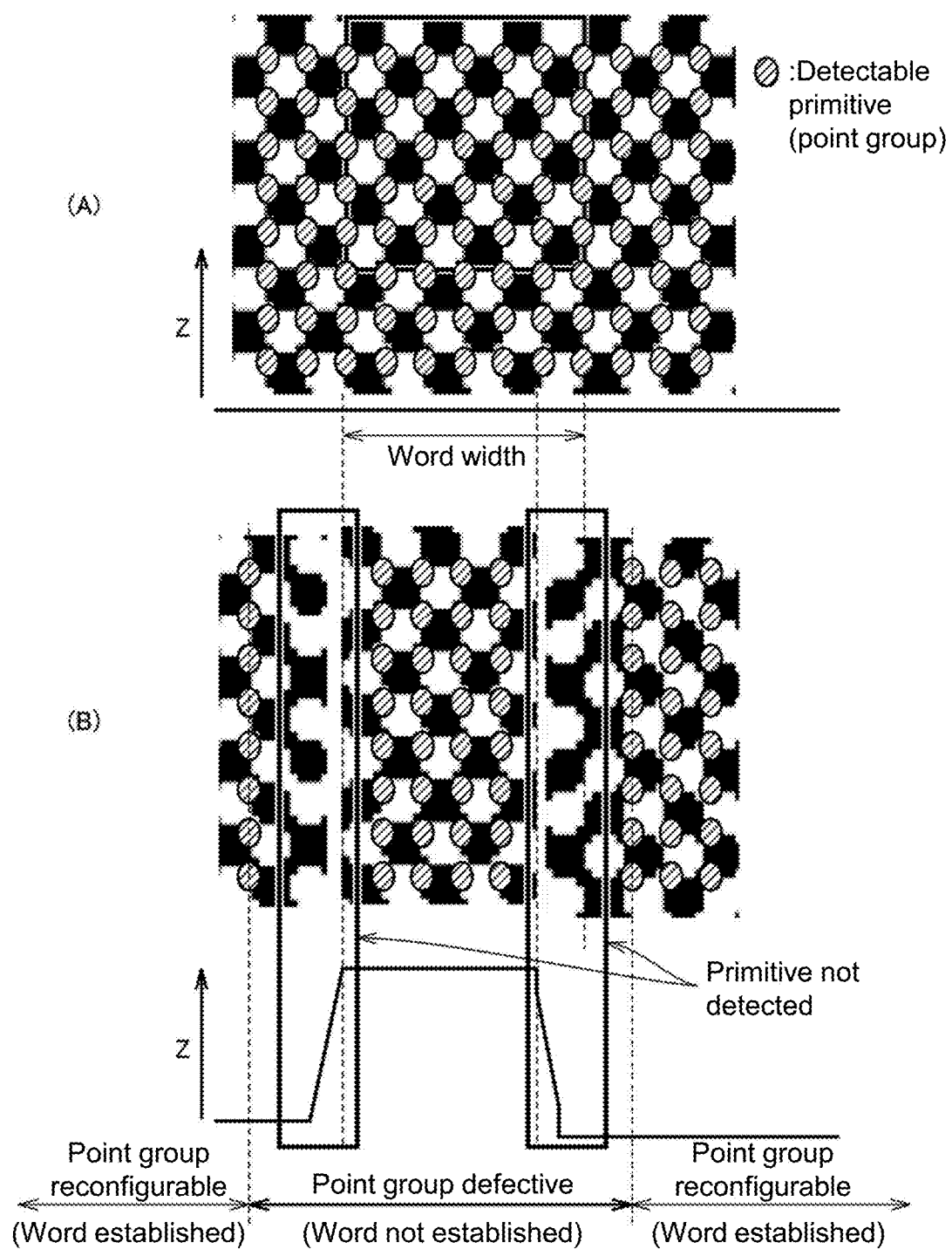
FIG. 7 is a diagram illustrating an example of a detection result of primitives for an input image obtained by imaging a workpiece shown in FIG. 6.

FIG. 7 is a diagram illustrating an example of a detection result of primitives for an input image obtained by imaging the workpiece shown in FIG. 6. Here, (A) of FIG. 7 shows an example of a detection result of primitives for an input image in which a planar portion is used as a visual field, and (B) of FIG. 7 shows an example of a detection result of primitives for an input image in which a convex portion is used as a visual field.

Referring to (A) of FIG. 7, in a case where a measurement surface is planar, it is possible to detect any number of primitives required for reconstructing a word. Thereby, since the light projection unit 12 and the imaging unit 13 can be associated therebetween, it is possible to restore three-dimensional information with respect to each point.

On the other hand, as shown in (B) of FIG. 7, in a case where irregularities within a word width are present on the measurement surface, and a stepped difference is relatively large, a failure in the detection of a primitive is caused by distortion of a primitive occurring due to the stepped difference, deterioration in contrast, generation of relatively large parallax, or the like (region of "primitive undetectable" in (B) of FIG. 7). As a result, since the number of primitives required for reconstructing a word are not arranged, the light projection unit 12 and the imaging unit 13 cannot be associated therebetween, and it is impossible to restore three-dimensional information of a point group inclusive of not only a region in which a failure in the detection of a primitive is caused but also the vicinity thereof (region of "point group defective" in (B) of FIG. 7). In this manner, a code detected with respect to a defective region of a point group becomes an incomplete code.

Figure 8:
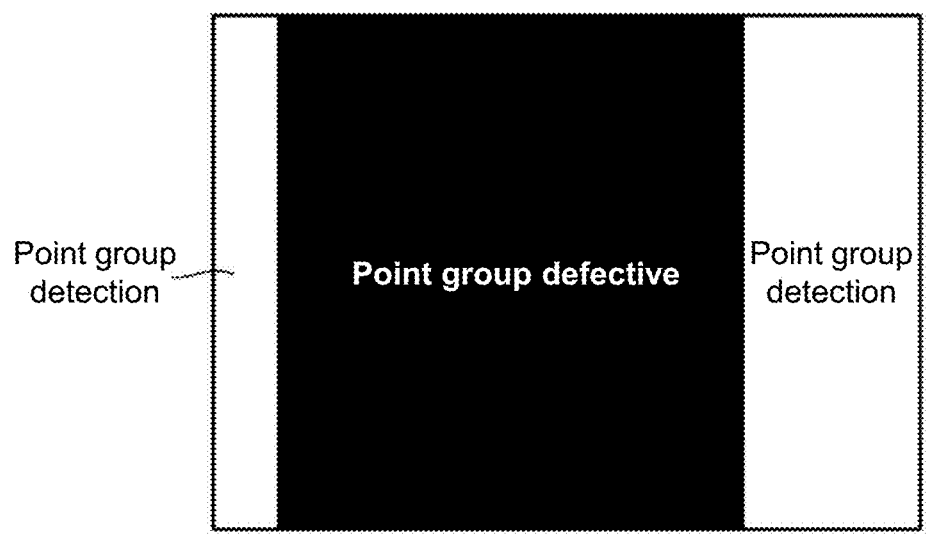
FIG. 8 is a diagram illustrating an example of a restoration result of three-dimensional information corresponding to a primitive detection result shown in (B) of FIG. 7.

FIG. 8 is a diagram illustrating an example of a restoration result of three-dimensional information corresponding to the primitive detection result shown in (B) of FIG. 7. In a case where the width of the protruding portion 5 formed on the planar workpiece 4 is less than a width required for reconstructing a word, as shown in FIG. 8, three-dimensional information of a point group is not present in the vicinity of the protruding portion 5 (a defective region of a point group).

Figure 9:
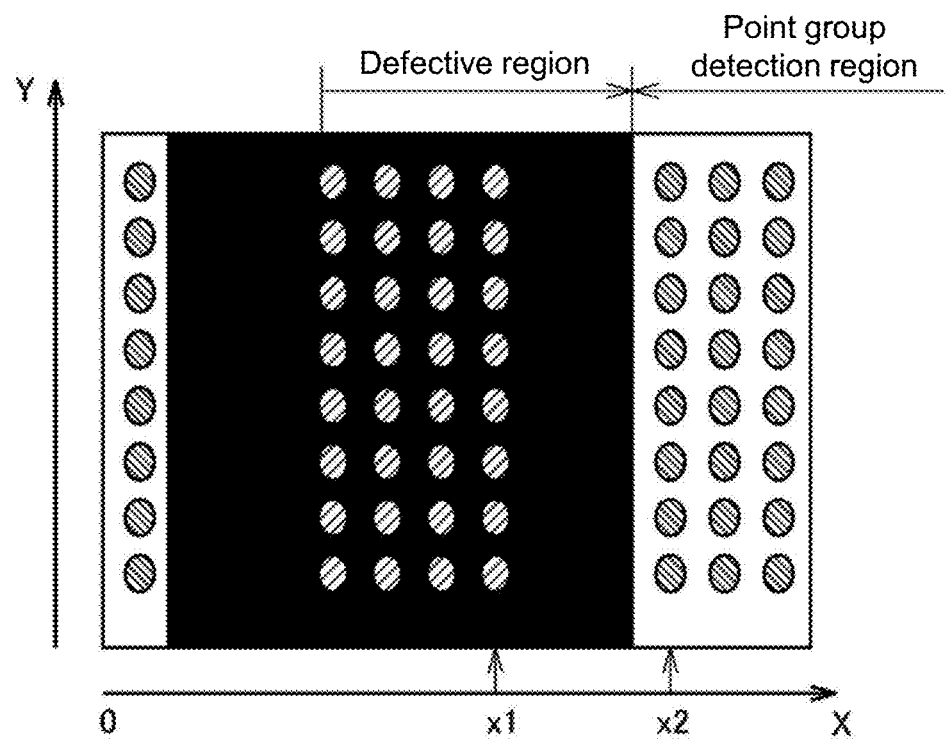
FIG. 9 is a diagram illustrating a process of estimating three-dimensional information with respect to the restoration result of three-dimensional information shown in FIG. 8.

FIG. 9 is a diagram illustrating a process of estimating three-dimensional information with respect to the restoration result of three-dimensional information shown in FIG. 8. In the example shown in FIG. 9, enough primitives to reconstruct a word cannot be detected with respect to the point group defective region, but in reality, there is success in the detection of four primitives. The measurement system 1 according to the present embodiment estimates three-dimensional information of a point group by relieving primitives detected within such a point group defective region using a virtual background image that will be described later.

That is, the measurement system 1 according to the present embodiment provides a process of estimating three-dimensional information with respect to such a portion (point group defective region) or the like having a change width smaller than the size of a single word included in the projection pattern P.

Meanwhile, in FIG. 9, X1 indicates a right boundary in which primitives can be detected in the point group defective region in the input image, and X2 indicates a left boundary of a region in which three-dimensional information of a point group on the input image can be restored (a region in which a word can be reconstructed).

Figure 10A:
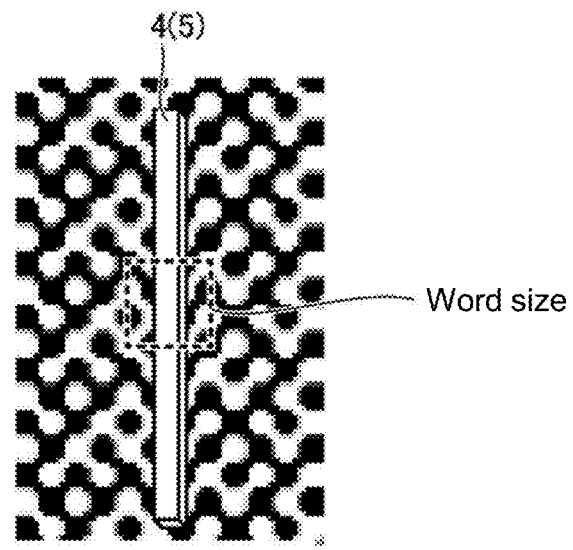
FIG. 10(A) and FIG. 10(B) are schematic diagrams illustrating a process capable of estimating three-dimensional information based on the measurement system according to the present embodiment.
Figure 10B:
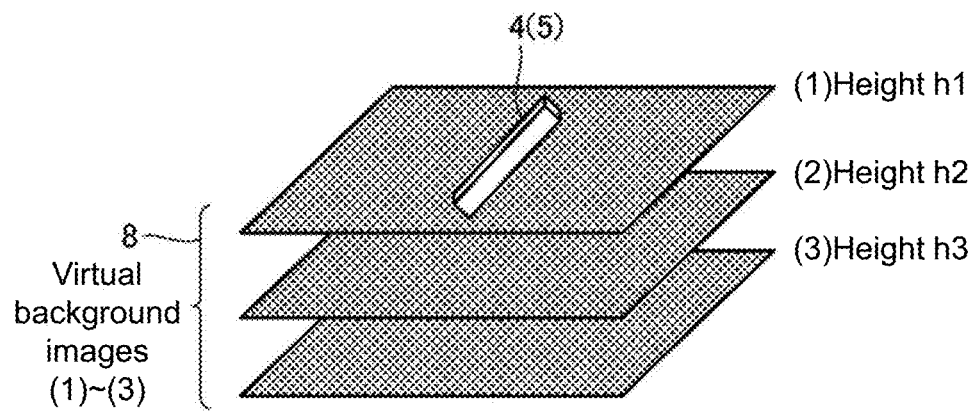

FIG. 10(A) and FIG. 10(B) are schematic diagrams illustrating a process capable of estimating three-dimensional information based on the measurement system 1 according to the present embodiment. As shown in FIG. 10(A), a height cannot be detected with respect to a change finer than a word size equivalent to the size of a single word. For example, the protruding portion 5 or the like formed on the surface of the workpiece 4 shown in FIG. 6 described above is assumed.

Regarding such a portion in which a height cannot be detected, as shown in FIG. 10(B), one or a plurality of virtual background images 8 are prepared. The virtual background image 8 is an image indicating a pattern that appears on a plane surface having one or a plurality of heights when the plane surface is irradiated with the projection pattern P. FIG. 10(B) shows an example in which three virtual background images (1) to (3) are prepared in association with three different heights h1, h2, and h3.

A primitive is extracted with respect to an image obtained by synthesizing a pattern appearing in the protruding portion 5 or the peripheral portion of the protruding portion 5 and a pattern of a region to which the virtual background image 8 corresponds, and a word is specified from the types of extracted primitives and a combination of types. The virtual background image 8 or the range of the virtual background image 8 which is a synthesis target is sequentially varied, and the process is repeated until decoding of a word is successful. In a case where a word is finally decoded, a height that cannot be detected in first measurement is estimated using the decoded word.

In the examples shown in FIG. 10(A) and FIG. 10(B), since the virtual background image (2) and the virtual background image (3) are away from the height of the protruding portion 5, a word cannot be appropriately decoded. That is, because a portion in which height information is defective and the virtual background image 8 do not coincide with each other, a word cannot be decoded.

On the other hand, since a height corresponding to the virtual background image (1) is close to the height of the protruding portion 5, there is an increasing possibility of a word being able to be decoded. Meanwhile, in decoding a word, a peripheral search is executed, and thus in a case where there is a certain amount of margin in a height direction, and the height of the workpiece 4 (or the protruding portion 5) and the height of the virtual background image which is a target are close to each other, a word can be restored.

Figure 11:
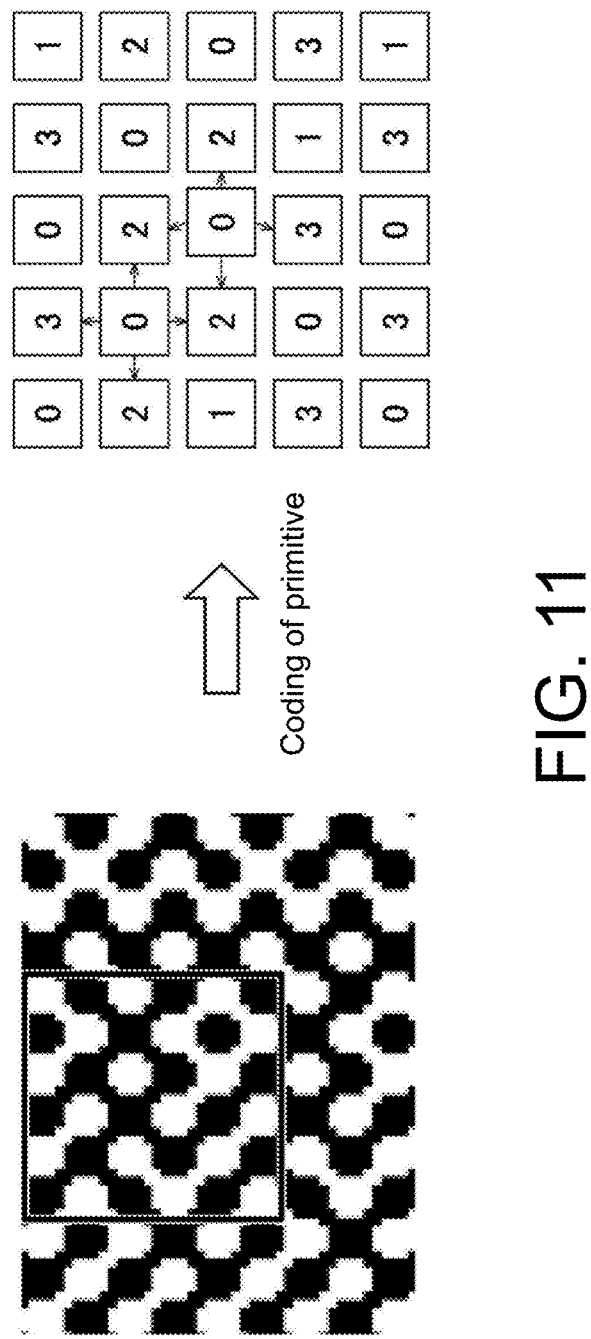
FIG. 11 is a schematic diagram illustrating a process of a peripheral search in the measurement system according to the present embodiment.

Here, a peripheral search will be described. FIG. 11 is a schematic diagram illustrating a process of a peripheral search in the measurement system 1 according to the present embodiment. FIG. 11 shows an example of a result obtained by coding each primitive detected from an irradiation pattern. That is, the drawing shows an example in which the type of each primitive detected is represented by a corresponding code.

In the peripheral search, a word is restored by detecting primitives adjacent to each other vertically and horizontally with reference to an arbitrary primitive of interest. In a case where the range of the peripheral search is made larger, it takes time to perform a decoding process. In addition, in a case where adjacent primitives are defective, a word cannot be restored in the peripheral search.

FIG. 12(A) to FIG. 12(D) are diagrams schematically illustrating the details of a process of estimating three-dimensional information based on the measurement system 1 according to the present embodiment. FIG. 12(A) shows an example in which one word is constituted by 5×5 (a total of 25) primitives as an example. Here, in a case where one primitive is constituted by 5×5 pixels, an area of 25×25 pixels is required for decoding a word. That is, a minimum unit (resolution) capable of detecting height information shown in FIG. 12(A) is 25×25 pixels. In other words, height information of a fine portion within 25×25 pixels cannot be detected.

As shown in FIG. 12(B), in a case where the height change amount (stepped difference) of an object within a single word is relatively small, a parallax occurring between the light projection unit 12 and the imaging unit 13 of the measuring head 10 is small. Therefore, since a corresponding primitive can be detected through the peripheral search, there is a high possibility of a word being able to be restored.

On the other hand, as shown in FIG. 12(C), in a case where the height change amount (stepped difference) of an object within a single word is relatively large, a parallax occurring between the light projection unit 12 and the imaging unit 13 of the measuring head 10 also becomes large, and a corresponding primitive cannot be detected in the peripheral search. As a result, there is a decreasing possibility of a word being able to be restored.

Consequently, as shown in FIG. 12(D), it can be understood that, in a case where a height different from a height associated with any of the virtual background images is calculated by confronting a primitive fragment P1 which is extracted but is not able to be decoded to a word with a primitive fragment P2 extracted from a region to which the virtual background image corresponds, the primitive fragments are coupled to each other, and can be appropriately decoded.

Meanwhile, in a case where the range of the peripheral search is made larger, a problem that it takes time to perform a decoding process may occur. In a case where array information (code string) required for the peripheral search cannot be acquired, it is not possible to restore original height information.

Therefore, in a case where the peripheral search is attempted, but the height information cannot be restored, the average height of peripheral portions may be adopted as peripheral information, and the restoration of the height information may be attempted again using a virtual pattern corresponding to the average height. Further, in a case where the restoration of the height information has failed, the same process may be repeated by changing the height of the virtual background image step by step. Here, one step can be set to a parallax amount (synonymous with the height information) which is a target for the peripheral search.

E. Functional Configuration

Next, a functional configuration for realizing a process of estimating three-dimensional information which is provided by the measurement system 1 according to the present embodiment will be described.

Figure 13:
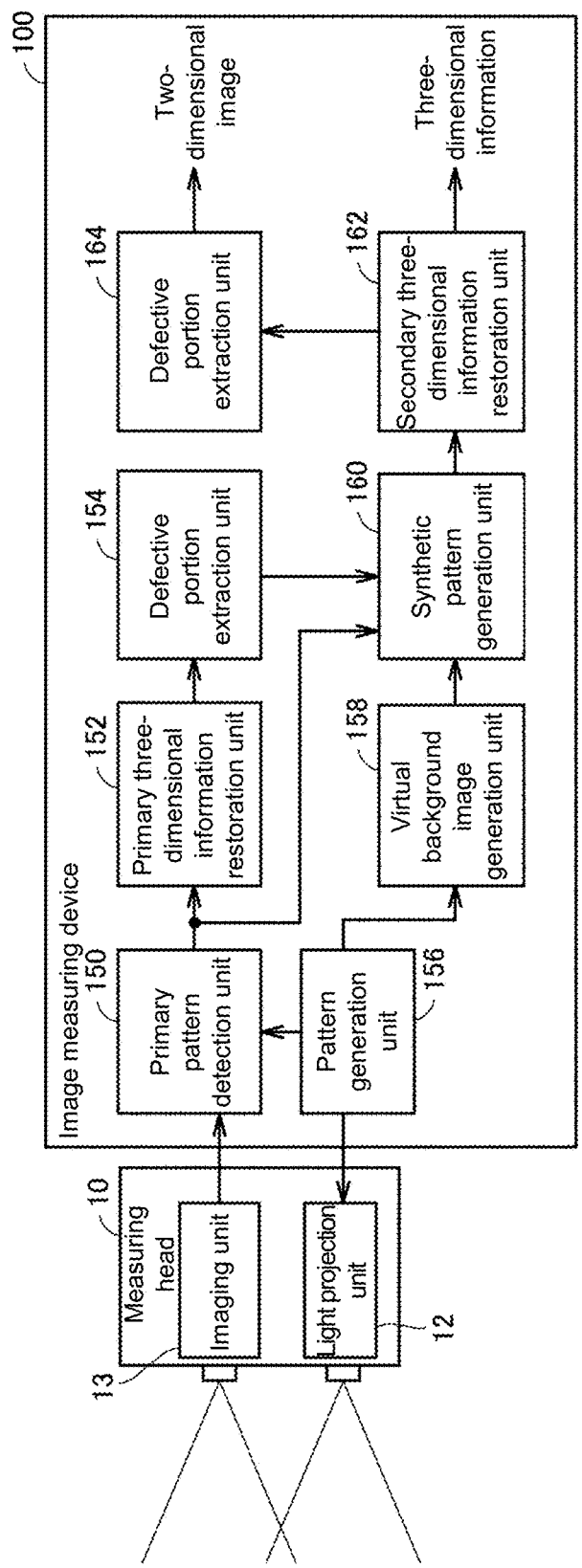
FIG. 13 is a schematic diagram illustrating an example of a functional configuration for realizing a process of estimating three-dimensional information which is provided by the measurement system according to the present embodiment.

FIG. 13 is a schematic diagram illustrating an example of a functional configuration for realizing a process of estimating three-dimensional information which is provided by the measurement system 1 according to the present embodiment. Typically, each function shown in FIG. 13 is realized by the processor 102 of the image measuring device 100 executing the three-dimensional measurement program 1062.

Referring to FIG. 13, the image measuring device 100 is connected to the measuring head 10, and outputs three-dimensional information and a two-dimensional image (which is substantially the same as the input image) on the basis of the input image obtained by imaging the object in a state where the object is irradiated with the projection pattern P. More specifically, the image measuring device 100 includes a primary pattern detection unit 150, a primary three-dimensional information restoration unit 152, a defective portion extraction unit 154, a pattern generation unit 156, a virtual background image generation unit 158, a synthetic pattern generation unit 160, a secondary three-dimensional information restoration unit 162, and a synthetic image removal unit 164.

The pattern generation unit 156 generates the projection pattern P determined in advance, and outputs the generated projection pattern to the light projection unit 12 and the primary pattern detection unit 150. The light projection unit 12 irradiates the object with the projection pattern P indicated from the pattern generation unit 156.

The primary pattern detection unit 150 searches for each primitive (reference pattern) included in the radiated projection pattern P within the input image, to thereby generate a set of codes indicated by a position at which each primitive is radiated and the radiated primitive. More specifically, the primary pattern detection unit 150 accepts the input image generated by the imaging unit 13 imaging the object, and detects primitives and words from a pattern appearing in the input image. The primary pattern detection unit 150 acquires the generated set of codes, and searches for a lattice-like code pattern (equivalent to a corresponding region), indicating the same array as an array of codes indicated by a predetermined number of primitives included in a word (equivalent to a unit region) set in the projection pattern P, from the set of codes.

The primary pattern detection unit 150 outputs the positions of the detected primitives and words to the primary three-dimensional information restoration unit 152. In addition, the primary pattern detection unit 150 outputs the input image from the imaging unit 13 to the synthetic pattern generation unit 160.

The primary three-dimensional information restoration unit 152 calculates a distance from the irradiation reference surface (the irradiation surface of the light projection unit 12) of the projection pattern P to each portion of the object on the basis of the search result of the lattice-like code pattern (equivalent to a corresponding region). More specifically, the primary three-dimensional information restoration unit 152 restores three-dimensional information within a visual field corresponding to the input image on the basis of the positions of the primitives and words from the primary pattern detection unit 150. The restored three-dimensional information is output to the defective portion extraction unit 154.

The defective portion extraction unit 154 specifies a region (portion defective in the height information) in which the three-dimensional information cannot be acquired on the basis of the three-dimensional information from the primary three-dimensional information restoration unit 152. Information of the defective portion is output to the synthetic pattern generation unit 160.

The virtual background image generation unit 158 is equivalent to a background information generation unit, and generates a virtual background image to be captured in a case where the projection pattern P is radiated from the irradiation reference surface (the irradiation surface of the light projection unit 12) to a plane surface located at an arbitrary distance. The virtual background image generation unit 158 may generate a virtual background image code corresponding to the virtual background image instead of the virtual background image. In this manner, the virtual background image generation unit 158 generates one or a plurality of virtual background images 8 corresponding to an arbitrary height on the basis of information of the projection pattern P from the pattern generation unit 156. Normally, the virtual background image generation unit 158 generates a plurality of virtual background images 8 or virtual background image codes with respect to plane surfaces located at a plurality of different distances from the irradiation reference surface. The generated virtual background images 8 are output to the synthetic pattern generation unit 160.

The synthetic pattern generation unit 160 synthesizes a partial pattern corresponding to the virtual background image with a portion corresponding to the defective portion of the input image or the vicinity of the corresponding portion. More specifically, the synthetic pattern generation unit 160 generates a synthetic image by extracting a corresponding image from the virtual background image 8 provided from the virtual background image generation unit 158 on the basis of the information of the defective portion from the defective portion extraction unit 154, and adding the corresponding image to the input image from the primary pattern detection unit 150. The synthetic pattern generation unit 160 outputs the generated synthetic image to the secondary three-dimensional information restoration unit 162.

The secondary three-dimensional information restoration unit 162 attempts to estimate a distance for a defective portion by reconstructing an incomplete code corresponding to the defective portion using peripheral information in the input image. In the present embodiment, the secondary three-dimensional information restoration unit 162 attempts to estimate a distance for the defective portion using information of the input image corresponding to the defective portion for which the primary three-dimensional information restoration unit 152 cannot calculate a distance and the virtual background image or the virtual background image code.

That is, the secondary three-dimensional information restoration unit 162 restores the three-dimensional information for the defective portion on the basis of the generated synthetic image.

The secondary three-dimensional information restoration unit 162 adds the restored three-dimensional information for the defective portion to the three-dimensional information restored by the primary three-dimensional information restoration unit 152, and outputs the result as final three-dimensional information. Here, the secondary three-dimensional information restoration unit 162 attempts to search for the lattice-like code pattern (equivalent to the corresponding region) while sequentially changing at least one of the partial pattern of the virtual background image synthesized with the input image and a distance for a plane surface when the virtual background image is generated. The details thereof will be described later. In addition, the secondary three-dimensional information restoration unit 162 outputs the synthetic image to the synthetic image removal unit 164.

The synthetic image removal unit 164 executes a process reverse to the process in the synthetic pattern generation unit 160. More specifically, the synthetic image removal unit 164 removes the synthesized image from the synthetic image from the secondary three-dimensional information restoration unit 162, and outputs the result as a two-dimensional image.

Meanwhile, although not shown in FIG. 13, various application processes of controlling a robot or the like may be executed on the basis of the three-dimensional information which is output from the secondary three-dimensional information restoration unit 162.

F. Processing Sequence

Next, a processing sequence for realizing a process of estimating three-dimensional information which is provided by the measurement system 1 according to the present embodiment will be described.

Figure 14:
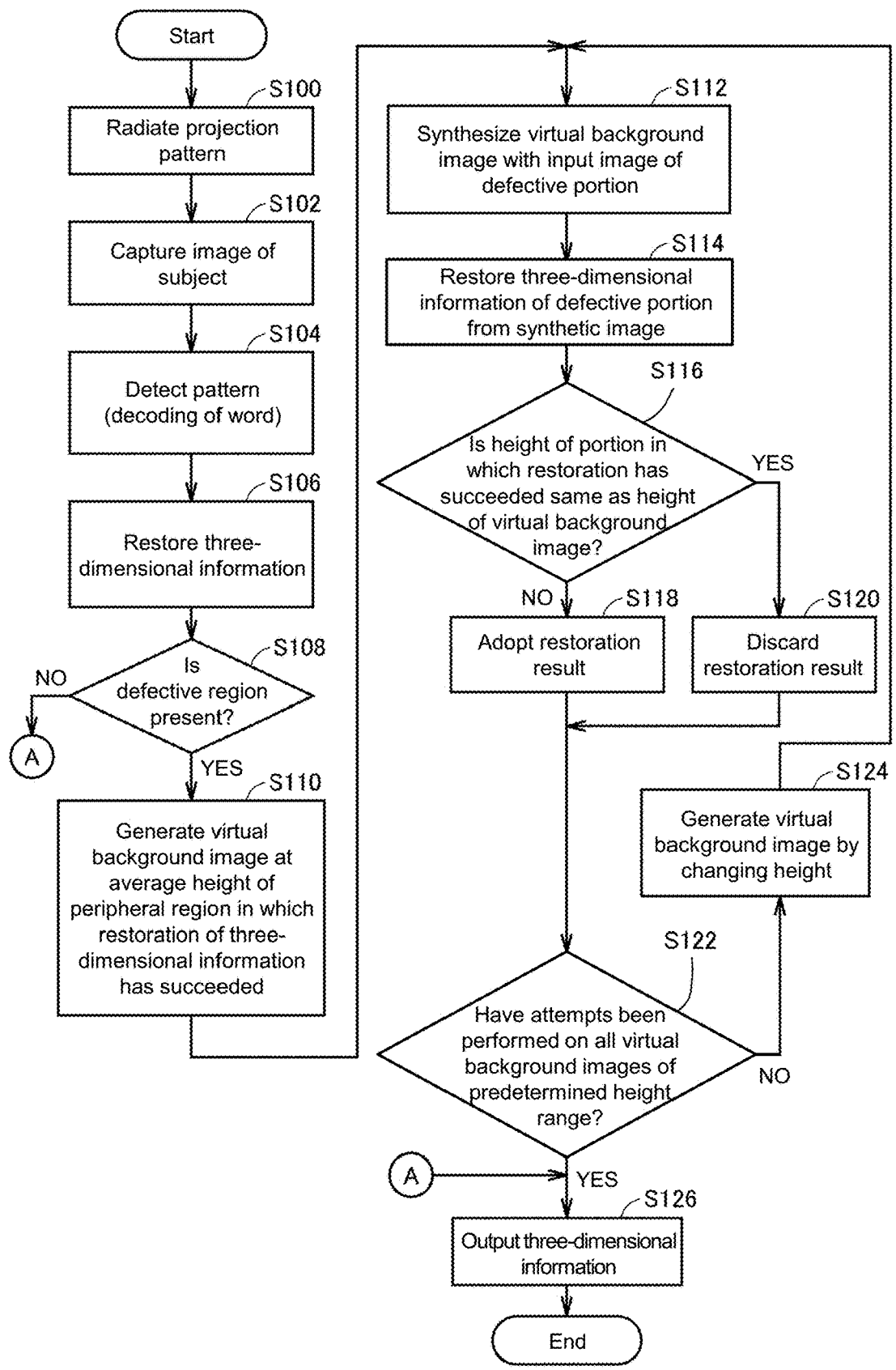
FIG. 14 is a flow chart illustrating a processing sequence of estimating three-dimensional information which is provided by the measurement system according to the present embodiment.

FIG. 14 is a flow chart illustrating a processing sequence of estimating three-dimensional information which is provided by the measurement system 1 according to the present embodiment. Typically, each step shown in FIG. 14 is realized by the processor 102 of the image measuring device 100 executing the three-dimensional measurement program 1062.

Referring to FIG. 14, the image measuring device 100 irradiates the object with the projection pattern P (step S100), and images the object in a state where the object is irradiated with the projection pattern P (step S102). The image measuring device 100 detects a pattern included in the input image acquired in step S102 (step S104). More specifically, the image measuring device 100 detects primitives included in the input image, and detects words corresponding to the types of detected primitives. That is, the image measuring device 100 decodes the words from the input image.

Subsequently, the image measuring device 100 restores the three-dimensional information within a visual field corresponding to the input image on the basis of the positions of the detected primitives and words (step S106). More specifically, the image measuring device 100 calculates a height at each primitive position using triangulation based on the positions of the detected primitives and words.

The image measuring device 100 determines whether a defective portion is present in the restored three-dimensional information (step S108). In a case where the defective portion is not present (NO in step S108), the image measuring device 100 outputs the restored three-dimensional information (step S126), and ends the process.

On the other hand, in a case where the defective portion is present (YES in step S108), the image measuring device 100 generates a virtual background image 8 corresponding to the average height of peripheral portions in which the restoration of the three-dimensional information has succeeded with respect to the defective portion (step S110). Subsequently, the image measuring device 100 generates a synthetic image by synthesizing the generated virtual background image 8 with the defective portion of the input image (step S112). The image measuring device 100 restores the three-dimensional information of the defective portion from the synthetic image generated in step S112 (step S114).

The image measuring device 100 determines whether the height of a portion in which restoration has succeeded is the same as the height of the virtual background image 8 used in image synthesis (step S116).

In a case where the height of the portion in which restoration has succeeded is the same as the height of the virtual background image 8 used in image synthesis (YES in step S116), the image measuring device 100 discards the restoration result (step S120). The process proceeds to step S122. Three-dimensional information obtained in this case is considered to be restored using the information of the virtual background image 8 independently, and this is because there is a high possibility of not being the original height of the defective portion.

On the other hand, in a case where the height of the portion in which restoration has succeeded is not the same as the height of the virtual background image 8 used in image synthesis (NO in step S116), the image measuring device 100 adopts the three-dimensional information restored in step S114 (step S118).

That is, the image measuring device 100 determines that the estimation of a distance for the defective portion is successful in a case where the estimated distance for the defective portion is different from a distance when the virtual background image 8 (or the virtual background image code to be described later) used in the estimation is generated. Such a determination process is aimed at preventing a distance when the virtual background image 8 is generated from being incorrectly estimated as a distance for the defective portion.

After the execution of step S118 or S120, the image measuring device 100 determines whether attempts have been performed on all the virtual background images 8 of a predetermined height range (step S122).

In a case where there is something on which attempts are not yet performed among the virtual background images 8 of a predetermined height range (NO in step S122), the image measuring device 100 generates a virtual background image 8 by changing a height with respect to the defective portion (step S124). Step S112 and the subsequent processes are repeated.

On the other hand, in a case where attempts are performed on all the virtual background images 8 of a predetermined height range (YES in step S122), the image measuring device 100 outputs the restored three-dimensional information (step S126). That is, the three-dimensional information adopted in step S118 is output. However, in a case where none of the three-dimensional information is adopted, information indicating that three-dimensional information cannot be still restored may be output. The process ends.

Meanwhile, the virtual background image 8 corresponding to the average height of regions in which the restoration of three-dimensional information has succeeded may be generated in the vicinity of the defective portion. In a case where the three-dimensional information cannot be appropriately restored even using the virtual background image 8 generated first, the virtual background image 8 is generated again by changing a height at which the virtual background image 8 is generated.

The size of a step of changing the height of the virtual background image 8 may be set to a height equivalent to the search range of the peripheral search. The generation of the virtual background image 8 and the restoration of the three-dimensional information are repeatedly executed between predetermined height ranges. The predetermined height range may be set to an effective measurement range or a range base on the shape of a detection workpiece.

G. Estimation Process: Image Based

Next, the details of a process (equivalent to steps S112, S122, and S124 shown in FIG. 14) of estimating three-dimensional information which is provided by the measurement system 1 according to the present embodiment will be described.

Figure 15A:
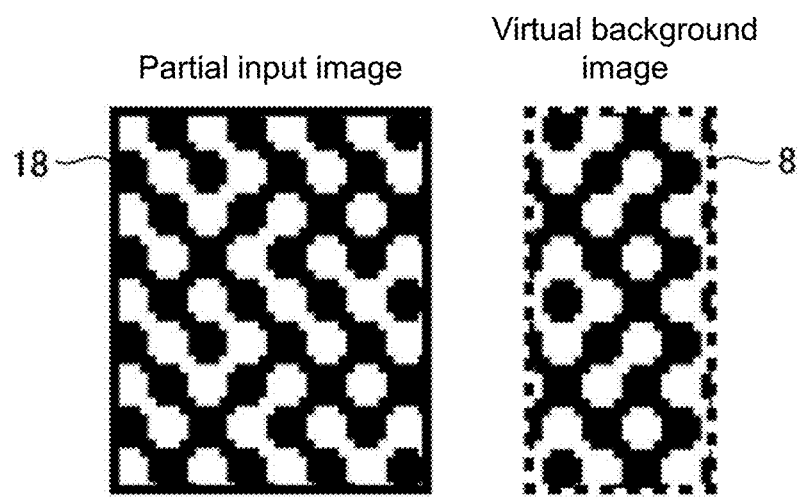

FIG. 15(A) to FIG. 5(D) are diagrams illustrating a process (image based) of estimating three-dimensional information which is provided by the measurement system 1 according to the present embodiment.

(1) First, a right boundary X1 in which primitives can be detected in a point group defective region on the input image and a left boundary X2 in a region (region in which words can be reconstructed) in which three-dimensional information of a point group can be restored on the input image are searched for (see FIG. 9). (2) A region up to X1 is cut out as a partial input image 18 on the input image (see FIG. 15(A)).

(3) Subsequently, the average height $Z_0$ of a point group on a side close to the boundary X2 of a point group detection region is calculated (see FIG. 9). (4) The virtual background image 8 (average height $Z_0$) having the average height $Z_0$ in the interval of X1−α to X2+α is generated on the basis of a relationship between the point group defective region and the point group detection region in the average height $Z_0$ (see FIG. 15(A)).

Figure 15B:
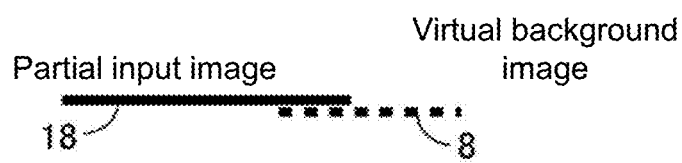

(5) The virtual background image 8 (average height $Z_0$) is overlapped with the partial input image from the rear side (backside of a layer) (see FIG. 15(B)). Here, an overlapping initial position is set to a position at which the right end of the partial input image and the left end of the virtual background image 8 are coincident with each other.

Figure 15C:
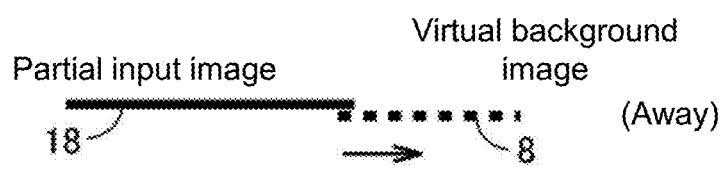
Figure 15D:
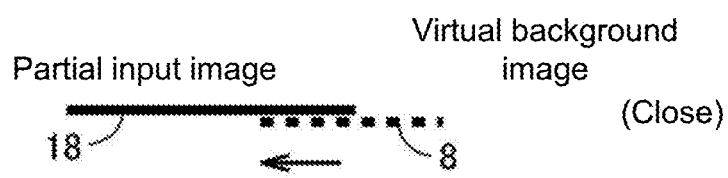

(6) The detection of primitives and the reconstruction of words are attempted with respect to a region located further right than the boundary X1. In a case where words cannot be reconstructed, the processes of (5) and (6) are repeated by changing an overlap position. That is, as shown in FIGS. 15(B) to 15(D), a relative positional relationship between the partial input image 18 and the virtual background image 8 are changed.

Here, changing an overlap position is equivalent to generating the virtual background image 8 by changing a height (step S124 in FIG. 14). That is, changing an overlap position means that the virtual background image 8 is moved parallel to the partial input image 18 along an epipolar line. This is equivalent to changing the height of the virtual background image 8. That is, a process of changing the height of the virtual background image 8 is realized by changing a positional relationship between information of the input image corresponding to the defective portion and the virtual background image along the epipolar line.

Figure 16:
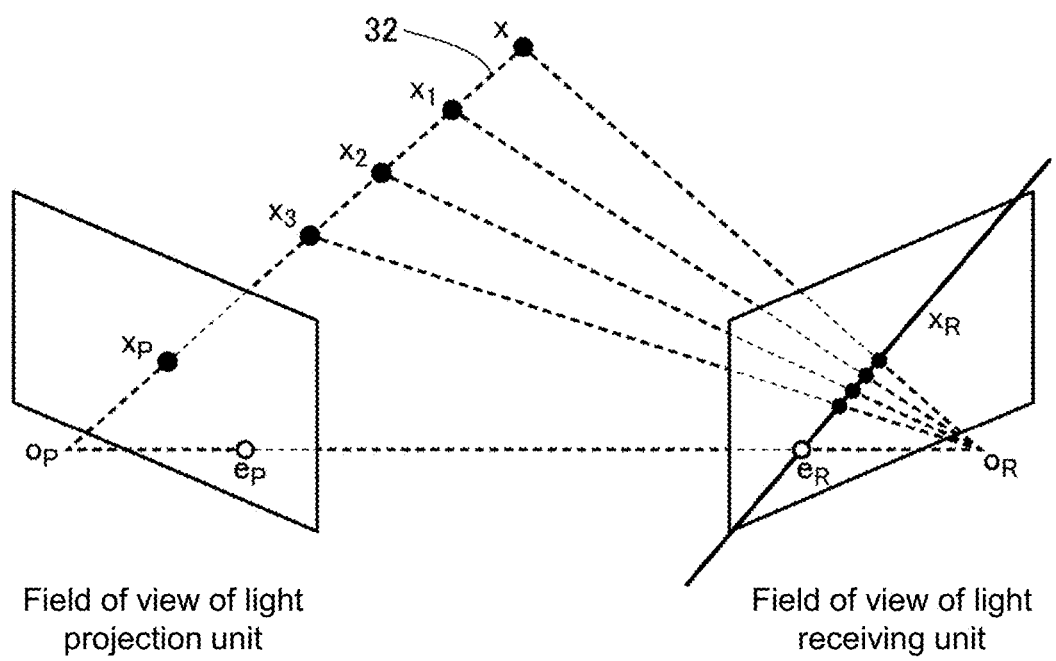
FIG. 16 is a diagram illustrating an epipolar line in the measurement system according to the present embodiment.

FIG. 16 is a diagram illustrating an epipolar line in the measurement system 1 according to the present embodiment. Referring to FIG. 16, in a case where an object changes in a depth direction within an overlap region between the visual field of the light projection unit 12 and the visual field of the imaging unit 13, a line having a change in an intersection point between both optical axes is equivalent to the epipolar line. Shifting a pattern along the epipolar line means changing a distance from the projection surface of the light projection unit 12.

Meanwhile, strictly speaking, a change in size (scale) occurs in the radiated projection pattern P by changing a height, but such a change in size (scale) is regarded as falling within a distortion allowable range of pattern detection. That is, even in a case where a size (scale) changes, it is considered that a pattern can be appropriately detected.

More specifically, as shown in FIGS. 15(B) to 15(D), regarding portions in which the three-dimensional information is restored while changing a distance between the partial input image 18 and the virtual background image 8 (that is, while changing the height of the virtual background image 8), restored values thereof are sequentially established.

Meanwhile, regarding search for primitives, deformation of a certain range (that is, fluctuation of a height) is allowed, and thus a few variations in height may be present on the point group defective region side.

(7) Finally, in a case where words can be reconstructed with respect to a region between the boundary X1 and the boundary X2, the process of estimating three-dimensional information ends.

FIG. 17(A) and FIG. 17(B) are diagrams illustrating a processing stage of a process of estimating three-dimensional information which is provided by the measurement system 1 according to the present embodiment.

In the example shown in FIG. 17(A), there is a certain distance between the partial input image 18 and the virtual background image 8, and thus deviation is present in the projection pattern P. Thereby, the detection of primitives and the reconstruction of words are not appropriately performed, which leads to a failure in detection.

On the other hand, in the example shown in FIG. 17(B), there is an appropriate distance between the partial input image 18 and the virtual background image 8. In this case, the detection of primitives and the reconstruction of words can be appropriately executed, which leads to success in detection.

H. Estimation Process: Code Based

In the above description, an example in which a process using the virtual background image 8 generated by changing a height, that is, a process in an image base is adopted is shown, but a process using a value (code; any value of 0 to 3 in the above-described example) indicating the type of each decoded primitive, that is, a code-based process may be adopted. In this case, whether a word can be reconstructed is a problem.

That is, a case where a process (equivalent to steps S112, S122, and S124 shown in FIG. 14) of estimating three-dimensional information which is provided by the measurement system 1 according to the present embodiment is executed on a code basis will be described.

FIG. 18 is a diagram illustrating a process (code based) of estimating three-dimensional information which is provided by the measurement system 1 according to the present embodiment.

(1) First, a right boundary X1 in which primitives can be detected in a point group defective region on the input image and a left boundary X2 in a region (region in which a word can be reconstructed) in which three-dimensional information of a point group can be restored on the input image are searched for (see FIG. 9). (2) A region up to X1 is cut out as an input image code 18C on the input image by coding each detected primitive (see FIG. 18).

(3) Subsequently, the average height $Z_0$ of a point group on a side close to the boundary X2 of a point group detection region is calculated (see FIG. 9). (4) A virtual background image code 8C (average height $Z_0$) having the average height $Z_0$ in the interval of X1−α to X2+α is generated on the basis of a relationship between the point group defective region and the point group detection region in the average height $Z_0$ (see FIG. 18).

(5) The virtual background image code 8C is overlapped with the input image code 18C. Here, an overlapping initial position is set to a position at which the rightmost row of the input image code 18C and the m row of the virtual background image code 8C are coincident with each other. At the initial position, a row equivalent to an "overlap portion" is overlapped.

(6) The detection of primitives and the reconstruction of words are attempted with respect to an overlapped code. In a case where a word cannot be reconstructed, the processes of (5) and (6) are repeated by sequentially incrementing the overlap position from the m row and changing the overlap position. Here, sequentially incrementing the overlap position from the m row and changing the overlap position means changing a relative relationship between the input image code 18C and the virtual background image code 8C along the epipolar line. That is, a process of changing the height of the virtual background image code 8C is realized by changing a positional relationship between information of the input image corresponding to the defective portion and the virtual background image code along the epipolar line.

The process shown in FIG. 18 is realized by the secondary three-dimensional information restoration unit 162 (see FIG. 13) of the image measuring device 100. That is, the secondary three-dimensional information restoration unit 162 repeats a process of searching for the same array as an array of codes indicated by a predetermined number of reference patterns included in a word (equivalent to a unit region) set in the projection pattern P with respect to one or a plurality of code strings generated by a combination of at least a portion of a code searched for in a portion corresponding to the defective portion of the input image and a code to which the virtual background image code corresponds.

In the code-based estimation process, the reconstruction of a word is attempted while performing a peripheral search. Therefore, even in a case where positions are not completely coincident with each other due to a plurality of height variations or the like, it is possible to reconstruct words.

(7) Finally, in a case where words can be reconstructed with respect to regions between the boundary X1 and the boundary X2, the process of estimating three-dimensional information ends.

By applying a condition in which words are disposed unique in a column direction, it can be determined that a word which is not present or the same word is not established.

I. Addition

The present embodiment as described above includes the following technical ideas.

[Configuration 1]

A measurement system comprising:

an acquisition unit (10) that acquires an input image which is an image obtained by imaging an object in a state where the object is irradiated with a projection pattern (P) determined in advance, the projection pattern being configured with multiple types of reference patterns to which specific codes are assigned in accordance with a predetermined rule;

a first distance calculation unit (150, 152) that searches for each reference pattern included in the radiated projection pattern within the input image to acquire a position at which each reference pattern is radiated and a set of codes indicated by the radiated reference pattern, searches for a corresponding region, indicating a same array as an array of codes indicated by a predetermined number of reference patterns included in a unit region set in the projection pattern, from a set of the codes, and calculates a distance from an irradiation reference surface of the projection pattern to each portion of the object on the basis of a search result of the corresponding region;

a background information generation unit (158) that generates a virtual background image to be captured in a case where the projection pattern is radiated from the irradiation reference surface to a plane surface located at an arbitrary distance or a virtual background image code corresponding to the virtual background image; and a second distance calculation unit (162) that attempts to estimate a distance for the defective portion for which the first distance calculation unit cannot calculate a distance using information of the input image corresponding to the defective portion and the virtual background image or the virtual background image code.

A measurement system comprising a second distance calculation unit that attempts to estimate a distance for a defective portion for which the first distance calculation unit cannot calculate the distance by reconstructing an incomplete code corresponding to the defective portion using peripheral information in the input image.

[Configuration 2]

The measurement system according to configuration 1, further comprising a background information generation unit that generates a virtual background image to be captured in a case where the projection pattern is radiated from the irradiation reference surface to a plane surface located at an arbitrary distance or a virtual background image code corresponding to the virtual background image, wherein the second distance calculation unit attempts to estimate a distance for the defective portion using information of the input image corresponding to the defective portion and the virtual background image or the virtual background image code.

[Configuration 3]

The measurement system according to configuration 2, further comprising a synthetic pattern generation unit (160) that synthesizes a corresponding partial pattern of the virtual background image with a portion corresponding to the defective portion of the input image or a vicinity of the corresponding portion, wherein the second distance calculation unit attempts to search for the corresponding region while sequentially changing at least one of the partial pattern of the virtual background image synthesized with the input image and a distance for a plane surface when the virtual background image is generated.

[Configuration 4]

The measurement system according to configuration 2, wherein the second distance calculation unit repeats a process of searching for a same array as an array of codes indicated by a predetermined number of reference patterns included in a unit region set in the projection pattern with respect to one or a plurality of code strings generated by a combination of at least a portion of a code searched for in a portion corresponding to the defective portion of the input image and a code to which the virtual background image code corresponds.

[Configuration 5]

The measurement system according to any one of configurations 2 to 4, wherein the background information generation unit generates a plurality of the virtual background images or the virtual background image codes with respect to plane surfaces located at a plurality of different distances from the irradiation reference surface.

[Configuration 6]

The measurement system according to any one of configurations 2 to 4, wherein the second distance calculation unit changes a positional relationship between the information of the input image corresponding to the defective portion and the virtual background image or the virtual background image code along an epipolar line.

[Configuration 7]

The measurement system according to any one of configurations 2 to 6, wherein the second distance calculation unit determines that estimation of the distance for the defective portion is successful in a case where the estimated distance for the defective portion is different from a distance when the virtual background image or the virtual background image code used in the estimation is generated.

[Configuration 8]

A measurement method comprising:

a step (S100, S102) of acquiring an input image which is an image obtained by imaging an object in a state where the object is irradiated with a projection pattern (P) determined in advance, the projection pattern being configured with multiple types of reference patterns to which specific codes are assigned in accordance with a predetermined rule;

a step (S104, S106) of searching for each reference pattern included in the radiated projection pattern within the input image to acquire a position at which each reference pattern is radiated and a set of codes indicated by the radiated reference pattern, searching for a corresponding region, indicating a same array as an array of codes indicated by a predetermined number of reference patterns included in a unit region set in the projection pattern, from a set of the codes, and calculating a distance from an irradiation reference surface of the projection pattern to each portion of the object on the basis of a search result of the corresponding region; and a step (S110, S112 to S126) of attempting to estimate a distance for a defective portion for which the distance is not able to be calculated by reconstructing an incomplete code corresponding to the defective portion using peripheral information in the input image.

J. Advantage

The image measurement system according to the present embodiment applies an estimation process using a virtual background image code or a virtual background image to be captured in a case where the projection pattern is radiated from the irradiation reference surface to a plane surface located at an arbitrary distance, with respect to the defective portion in which a distance from the irradiation reference surface of the projection pattern cannot be calculated. Thereby, even in the case of an object having a change in shape with a width smaller than the resolution of measurement, distance information thereof can be detected.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A measurement system comprising:

an acquisition unit comprising a first processor configured to acquire an input image which is an image obtained by imaging an object in a state where the object is irradiated with a projection pattern determined in advance, the projection pattern being configured with a plurality of types of reference patterns to which specific codes are assigned in accordance with a predetermined rule; and an image measuring device comprising a second processor, configured to search for each reference pattern included in the radiated projection pattern within the input image from the acquisition unit to acquire a position at which each reference pattern is radiated and a set of codes indicated by the radiated reference pattern, search for a corresponding region, indicating a same array as an array of codes indicated by a predetermined number of reference patterns included in a unit region set in the projection pattern, from a set of the codes, calculate a first distance from an irradiation reference surface of the projection pattern to each portion of the object on the basis of a search result of the corresponding region, attempt to estimate a second distance for a defective portion for which the first distance is not able to be calculated by reconstructing an incomplete code corresponding to the defective portion using peripheral information in the input image, and generate a virtual background image to be captured in a case where the projection pattern is radiated from the irradiation reference surface to a plane surface located at an arbitrary distance or a virtual background image code corresponding to the virtual background image, wherein the image measuring device attempts to estimate the second distance for the defective portion using information of the input image corresponding to the defective portion and the virtual background image or the virtual background image code.

2. The measurement system according to claim 1, wherein the image measuring device synthesizes a corresponding partial pattern of the virtual background image with a portion corresponding to the defective portion of the input image or a vicinity of the corresponding portion, wherein the image measuring device attempts to search for the corresponding region while sequentially changing at least one of the partial pattern of the virtual background image synthesized with the input image and a distance for a plane surface when the virtual background image is generated.

3. The measurement system according to claim 1, wherein the image measuring device repeats a process of searching for a same array as an array of codes indicated by a predetermined number of reference patterns included in a unit region set in the projection pattern with respect to one or a plurality of code strings generated by a combination of at least a portion of a code searched for in a portion corresponding to the defective portion of the input image and a code to which the virtual background image code corresponds.

4. The measurement system according to claim 1, wherein the image measuring device generates a plurality of the virtual background images or the virtual background image codes with respect to plane surfaces located at a plurality of different distances from the irradiation reference surface.

5. The measurement system according to claim 1, wherein the image measuring device changes a positional relationship between the information of the input image corresponding to the defective portion and the virtual background image or the virtual background image code along an epipolar line.

6. The measurement system according to claim 1, wherein the image measuring device determines that estimation of the second distance for the defective portion is successful in a case where the estimated second distance for the defective portion is different from a distance when the virtual background image or the virtual background image code used in the estimation is generated.

7. A measurement method, comprising steps of:

acquiring an input image which is an image obtained by imaging an object in a state where the object is irradiated with a projection pattern determined in advance, the projection pattern being configured with a plurality of types of reference patterns to which specific codes are assigned in accordance with a predetermined rule;

searching for each reference pattern included in the radiated projection pattern within the input image to acquire a position at which each reference pattern is radiated and a set of codes indicated by the radiated reference pattern, searching for a corresponding region, indicating a same array as an array of codes indicated by a predetermined number of reference patterns included in a unit region set in the projection pattern, from a set of the codes, calculating a first distance from an irradiation reference surface of the projection pattern to each portion of the object on the basis of a search result of the corresponding region, attempting to estimate a second distance for a defective portion for which the first distance is not able to be calculated by reconstructing an incomplete code corresponding to the defective portion using peripheral information in the input image, generating a virtual background image to be captured in a case where the projection pattern is radiated from the irradiation reference surface to a plane surface located at an arbitrary distance or a virtual background image code corresponding to the virtual background image, and attempting to estimate the second distance for the defective portion using information of the input image corresponding to the defective portion and the virtual background image or the virtual background image code.

8. The measurement system according to claim 2, wherein the image measuring device generates a plurality of the virtual background images or the virtual background image codes with respect to plane surfaces located at a plurality of different distances from the irradiation reference surface.

9. The measurement system according to claim 3, wherein the image measuring device generates a plurality of the virtual background images or the virtual background image codes with respect to plane surfaces located at a plurality of different distances from the irradiation reference surface.

10. The measurement system according to claim 2, wherein the image measuring device changes a positional relationship between the information of the input image corresponding to the defective portion and the virtual background image or the virtual background image code along an epipolar line.

11. The measurement system according to claim 3, wherein the image measuring device changes a positional relationship between the information of the input image corresponding to the defective portion and the virtual background image or the virtual background image code along an epipolar line.

12. The measurement system according to claim 2, wherein the image measuring device changes a positional relationship between the information of the input image corresponding to the defective portion and the virtual background image or the virtual background image code along an epipolar line.

13. The measurement system according to claim 3, wherein the image measuring device determines that estimation of the second distance for the defective portion is successful in a case where the estimated second distance for the defective portion is different from a distance when the virtual background image or the virtual background image code used in the estimation is generated.

14. The measurement system according to claim 4,
wherein the image measuring device determines that estimation of the second distance for the defective portion is successful in a case where the estimated second distance for the defective portion is different from a distance when the virtual background image or the virtual background image code used in the estimation is generated.

15. The measurement system according to claim 5,
wherein the image measuring device determines that estimation of the second distance for the defective portion is successful in a case where the estimated second distance for the defective portion is different from a distance when the virtual background image or the virtual background image code used in the estimation is generated.

16. The measurement system according to claim 8,
wherein the image measuring device determines that estimation of the second distance for the defective portion is successful in a case where the estimated second distance for the defective portion is different from a distance when the virtual background image or the virtual background image code used in the estimation is generated.

17. The measurement system according to claim 9,
wherein the image measuring device determines that estimation of the second distance for the defective portion is successful in a case where the estimated second distance for the defective portion is different from a distance when the virtual background image or the virtual background image code used in the estimation is generated.

18. The measurement system according to claim 10,
wherein the image measuring device determines that estimation of the second distance for the defective portion is successful in a case where the estimated second distance for the defective portion is different from a distance when the virtual background image or the virtual background image code used in the estimation is generated.

19. The measurement system according to claim 11,
wherein the image measuring device determines that estimation of the second distance for the defective portion is successful in a case where the estimated second distance for the defective portion is different from a distance when the virtual background image or the virtual background image code used in the estimation is generated.

\* \* \* \* \*